United States Patent
Yoshida et al.

(10) Patent No.: US 7,251,197 B2
(45) Date of Patent: Jul. 31, 2007

(54) WRIST-WORN COMMUNICATIONS APPARATUS

(75) Inventors: Kaoru Yoshida, Ome (JP); Yoshiyuki Murata, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 100 days.

(21) Appl. No.: 10/531,368

(22) PCT Filed: Jan. 30, 2004

(86) PCT No.: PCT/JP2004/000959

§ 371 (c)(1),
(2), (4) Date: Apr. 13, 2005

(87) PCT Pub. No.: WO2004/068732

PCT Pub. Date: Aug. 12, 2004

(65) Prior Publication Data

US 2005/0265125 A1    Dec. 1, 2005

(30) Foreign Application Priority Data

Jan. 30, 2003  (JP)  ............... 2003-021320
Feb. 10, 2003  (JP)  ............... 2003-032486

(51) Int. Cl.
*G04B 47/00*  (2006.01)
*G04C 11/02*  (2006.01)
*H04B 1/38*  (2006.01)

(52) U.S. Cl. ................ 368/10; 368/13; 368/47; 368/282; 455/90.3; 455/344

(58) Field of Classification Search ............ 368/4, 368/10, 13, 47, 88, 281, 292; 455/90.3, 344
See application file for complete search history.

(56) References Cited

U.S. PATENT DOCUMENTS

| | | | |
|---|---|---|---|
| 5,239,521 A | | 8/1993 | Blonder |
| 5,260,915 A | * | 11/1993 | Houlihan ............... 368/10 |
| 5,381,387 A | * | 1/1995 | Blonder et al. ......... 368/10 |
| 5,467,324 A | * | 11/1995 | Houlihan ............... 368/10 |
| 5,564,082 A | | 10/1996 | Blonder et al. |
| 6,078,803 A | | 6/2000 | Fernandez Martinez |
| 6,215,985 B1 | | 4/2001 | Tolvanen |
| 6,311,071 B1 | | 10/2001 | Voroba et al. |
| 2003/0019894 A1 | | 1/2003 | Caldana |

FOREIGN PATENT DOCUMENTS

| | | |
|---|---|---|
| EP | 0 572 252 A1 | 12/1993 |
| EP | 0 684 704 A2 | 11/1995 |
| EP | 0 782 308 A1 | 7/1997 |
| EP | 0 907 279 A2 | 4/1999 |
| WO | WO 98/05148 A1 | 2/1998 |
| WO | WO 01/61970 A2 | 8/2001 |

\* cited by examiner

*Primary Examiner*—Vit W. Miska
(74) *Attorney, Agent, or Firm*—Frishauf, Holtz, Goodman & Chick, P.C.

(57) ABSTRACT

A watch of the communications apparatus is worn on a user's wrist by bands. A support member pivoted on the band is then turned so as to extend in the transverse direction of the bands. A speaker unit is provided on the support member so as to face in a transverse direction of the band while a microphone unit is disposed on the support member so as to face in a direction perpendicular to a surface of the band. When a user communicates with the other party, the speaker unit provided on the support member is directed toward the user's ear. This causes the microphone unit provided on the support member to be directed easily toward the user's mouth. Alternatively a hinged lid is provided the lid carrying a key-in unit or a display and a speaker unit.

8 Claims, 20 Drawing Sheets

WRIST-WORN COMMUNICATIONS APPARATUS

This application is a U.S. National Phase Application under 35 USC 371 of International Application PCT/JP2004/000959 filed Jan. 30, 2004.

1. Technical Field

The present invention relates to wrist-worn communications apparatus worn on a user's wrist for communicating purposes.

2. Background Art

In the past, wristwatch type telephones are known that comprise a watch that has a communication function, a speaker unit, and a microphone unit provided on a wristband which is worn on a user's wrist (for example, International Publication WO98/05148).

In these wristwatch type telephones, the speaker and microphone units are provided at opposite ends of a case different from that of the watch and extending across the wristband. The speaker and microphone units face outward in opposite directions to thereby prevent the occurrence of so-called howling that the microphone picks up sound let off from the speaker unit.

In such telephones, the speaker unit and the microphone unit are disposed so as to face outward in the opposite directions across the wristband as just mentioned above. Thus, when it is used on the user's wrist, the front of the microphone unit through which sound is collected cannot be directed toward the user's mouth if the front of the speaker through which sound is let off is directed toward the user's ear on the side of his or her wrist mentioned with the whereas conversely, if the front of the microphone unit is directed toward the user's mouth the front of the speaker unit cannot be directed toward the user's ear mentioned. Thus, the directivities of both the microphone and speaker units cannot be sufficiently obtained.

It is therefore an object of the present invention to provide a wrist-worn communications apparatus in which when worn on a user's wrist, the speaker and the microphone can be satisfactorily directed toward the user's ear on the side of his or her wrist mentioned and mouth, respectively, to thereby ensure efficient use of the directivity of both the speaker and the microphone.

It is another object of the present invention to provide a wrist-worn communications apparatus by which a user is able to communicate with the other party in a natural posture without unnaturally bending his or her arm whose wrist wears a device of the apparatus.

DISCLOSURE OF INVENTION

In order to achieve the above objects, the present invention provides a wrist-worn communications apparatus comprising a device, a band for wearing the device on a user's wrist, a speaker unit disposed at a predetermined position on the band so as to face in the transverse direction of the band, and a microphone unit disposed close to the speaker unit on the band so as to face in the direction perpendicular to a surface of the band.

Thus, according to this invention, even though the speaker and microphone units are provided close to each other at the predetermined position on the band, howling is prevented from occurring. In addition, especially when it is worn on the user's wrist in use, the fronts of the microphone and speaker units in which sound is collected and let off can sufficiently be directed toward the user's mouth and ear on the side of his or her wrist mentioned, respectively, to thereby ensure the directivities of both the speaker and the microphone.

The present invention also provides a wrist-worn communications apparatus comprising a device, a band for wearing the device on a user's wrist, a support member attached at a predetermined position on the band where the support member can extend in the transverse direction of the band and in the extending direction of the band in which the support member is superposed on the band, a speaker unit provided on one end of the support member so as to face outward in the extending direction of the support member, and a microphone unit disposed on the other end of the support member so as to face in the direction substantially perpendicular to a surface of the support member.

According to this invention, the support member is attached pivotally at the predetermined position on the band such that the support member can extend in the transverse and extending directions of the band. Thus, when the device is worn on the user's wrist and the support member is directed so as to extend in the transverse direction of the band for communication use, the fronts of the microphone and speaker units are easily and surely directed by the support member toward the user's mouth and ear present on the user's wrist side, respectively, to thereby ensure the directivities of both the speaker and the microphone units.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

BEST MODE OF CARRYING OUT THE INVENTION

First Embodiment

Referring to FIGS. 1-4, a first embodiment of a wrist-worn communications apparatus according to the present invention will be described.

Figure 1:
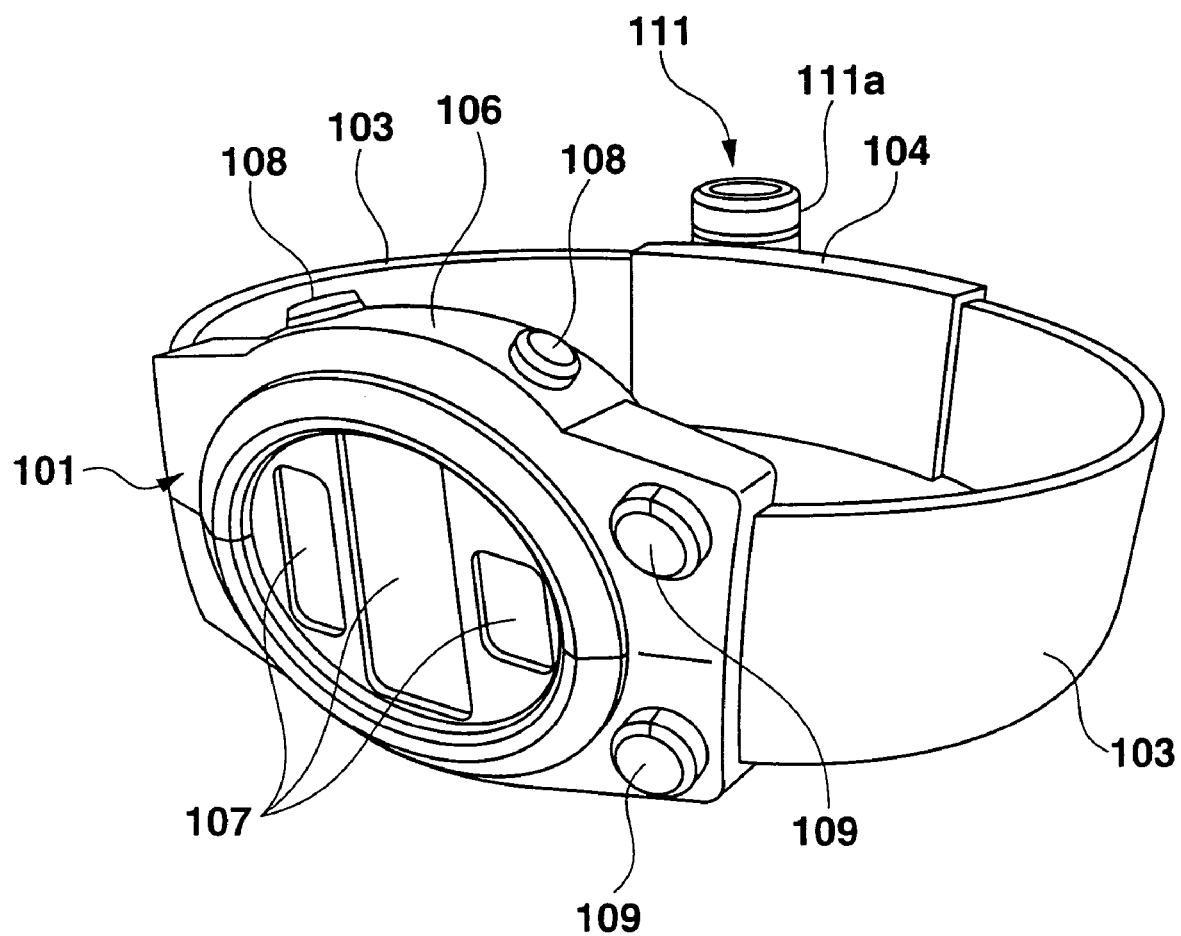
FIG. 1 is a perspective view of a first embodiment of a wrist-worn communications apparatus according to the present invention as viewed from substantially its front.
Figure 2:
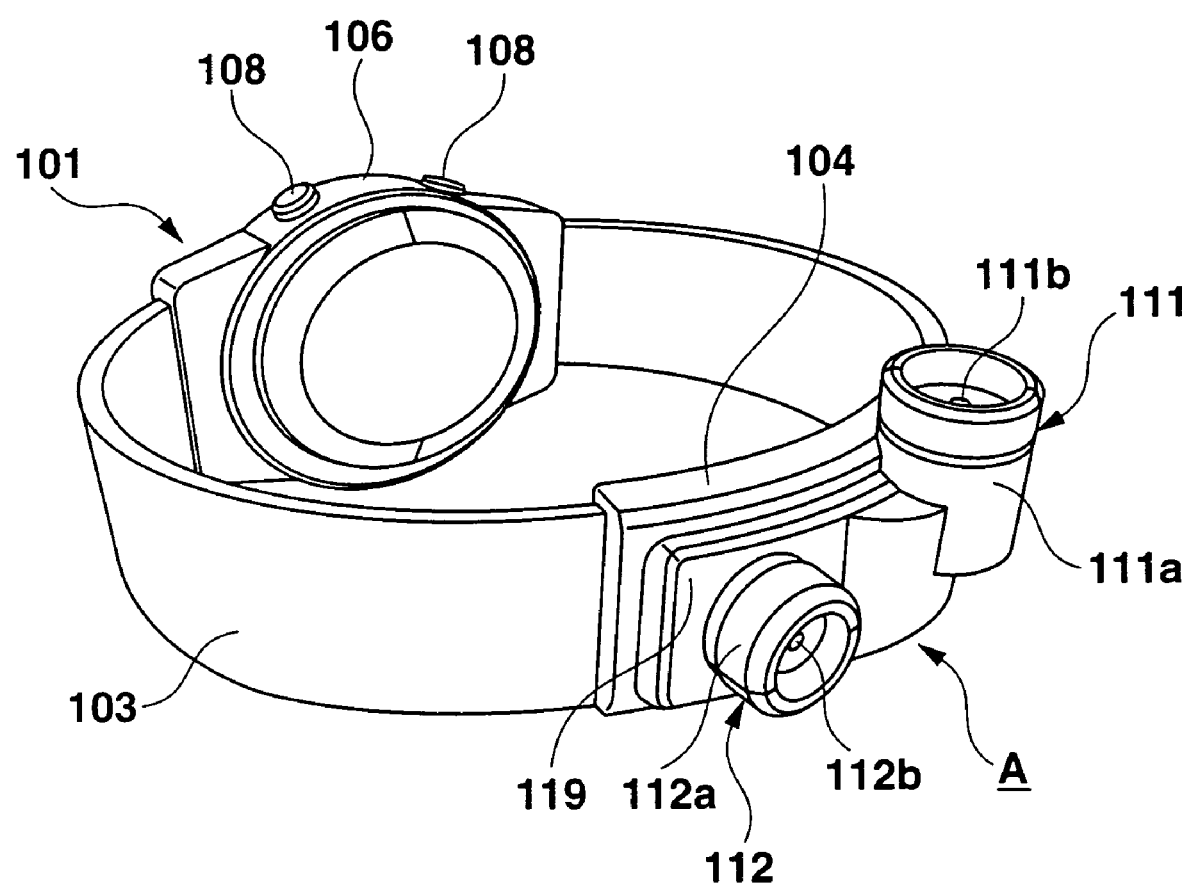
FIG. 2 is a perspective view of the apparatus of FIG. 1 as viewed from substantially its back.
Figure 3:
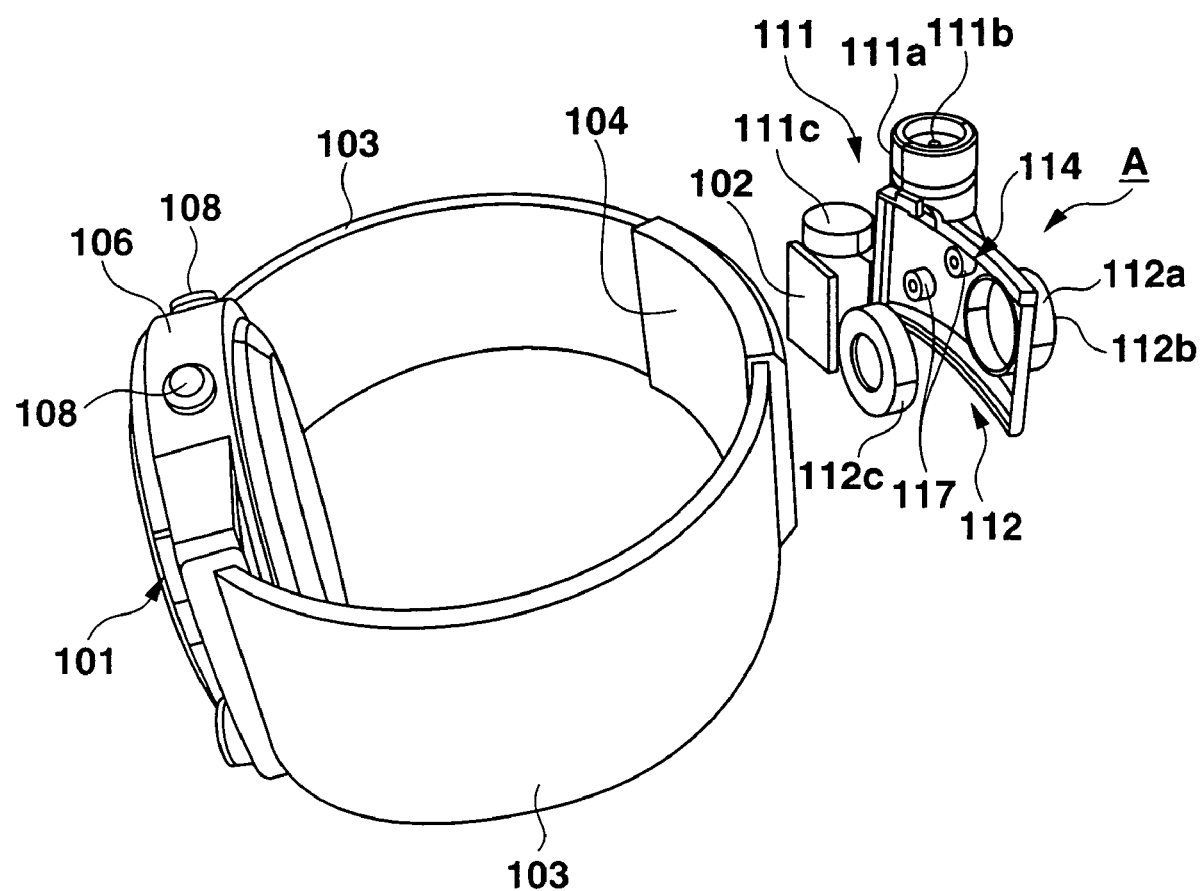
FIG. 3 is a perspective view of the communications apparatus of FIG. 2 with its speaker-microphone assembly dismantled separately.
Figure 4:
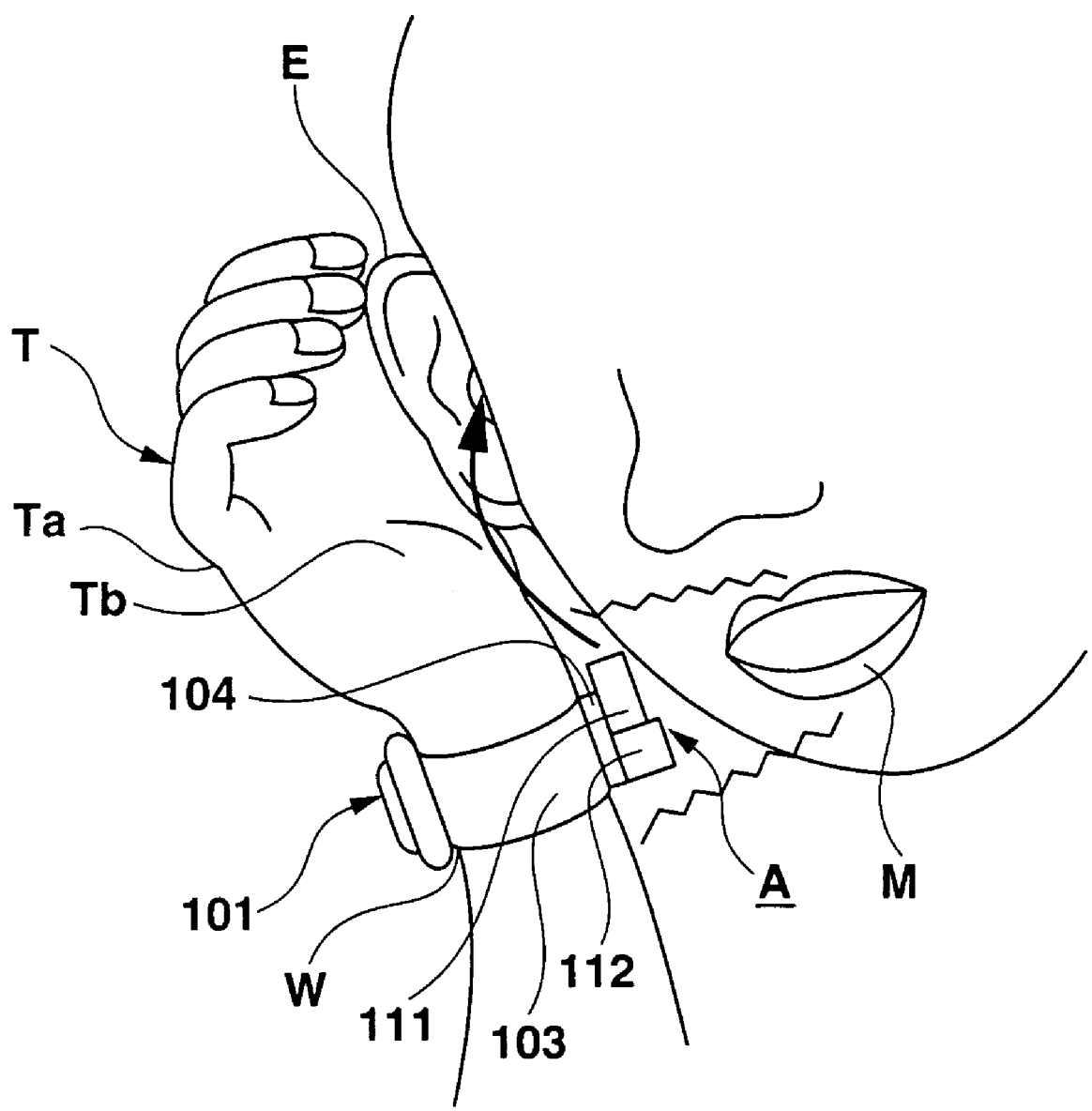
FIG. 4 illustrates use of the communications apparatus of FIG. 1.

FIG. 1 is a perspective view of this communications apparatus as viewed from substantially its front. FIG. 2 is a perspective view of the apparatus of FIG. 1 as viewed from substantially its back. FIG. 3 is a perspective view of the communications apparatus of FIG. 2 with its speaker-microphone assembly in a dismantled state. FIG. 4 illustrates the use of the communications apparatus of FIG. 1.

This communications apparatus comprises a watch 101, a pair of bands 103 of resilient plastic, for example of urethane, that are attached at one end to the watch 101 at 12 o'clock position and 6 o'clock position, a buckle 104 for connecting the bands disconnetably at the other end, and a speaker-microphone assembly "A."

As shown in FIG. 1, the watch 101 has a case 106 which contains a display unit 107 that comprises a liquid crystal display element or an electroluminesce element that displays various information such as time/communication data electro-optically, and various other electronic parts (not shown) such as compose, for example, a timepiece/transceiver circuit necessary for fulfilling timepiece and communication functions. The watch case 106 has on its side at 3 o'clock and 9 o'clock a plurality of push button switches 108 for time-correcting/mode-changing purposes. The watch case 106 also has a plurality of input switches 109 for communication use on its upper surface at 6 o'clock.

When the watch 101 is worn on the user's wrist W by the pair of bands 103, the buckle 104 is disposed on the opposite side of the user's wrist from the watch 101.

The speaker microphone assembly "A" may be attached by screws to, or engages with, the buckle 104 removably. As shown in FIG. 2, in the speaker-microphone assembly "A" the speaker unit 111 is provided on a mount 119 so as to face in the transverse direction of the band 103 while the microphone unit 112 is provided on the mount 119 so as to face in the direction perpendicular to the surface of the band 103. The mount 119 has an inner cavity that houses a circuit board 112, as shown in FIG. 3.

As shown in FIG. 3, the speaker unit 111 comprises a hollow sound let-off cylinder 111a and a speaker element 111c. The cylinder 111a extends upward from the mount 119 across the band 103 and has a closed upper end with a small sound hole 111b open thereon. The speaker element 111c is housed within the cylinder 111a at its bottom so as to let off sound upward toward the hole 111b through the hollow of the cylinder 111a.

As shown in FIG. 3, the microphone unit 112 comprises a sound-collecting cylinder 112a and a microphone element 112c. The sound-collecting cylinder 112a extends from the mount 119 in the direction perpendicular to the surface of the band 103 with its closed outward end with a sound collecting hole 112b open thereon. The microphone element 112c is housed within the cylinder 112a so as to face the hole 112b to thereby pick up external sound.

The circuit board 102 is attached, for example by screws (not shown), to bosses 117 provided on an inner surface of the mount 119 with the speaker unit 111c and the microphone unit 112c connected electrically by leads (not shown) to the circuit board 102. The circuit board 102 is connected electrically to an electronic circuit (not shown) housed within the watch 101 by leads (not shown) embedded within the bands 103. Thus, the speaker unit 111 produces a sound based on an electric signal from the watch 101, and the microphone unit 112 converts external sound to an electrical signal, which is then outputted to the watch 101.

A method of using the wrist-worn communications apparatus according to this invention will be described next. In this case, like a general wristwatch, the apparatus 101 is worn on the user's wrist W by coupling the bands 103 around the user's wrist through the buckle 104 such that the watch 101 faces in the same direction as the back Ta of the user's hand does and that the speaker-microphone assembly "A" faces in the same direction as the user's palm Tb does. Thus, this apparatus can be used as a general wristwatch as well as a cellular phone.

The user can know information such as time displayed on the display unit 107 of the watch 101 as in the general wristwatch. Then, when the user dials the phone number of the other party by operating the input switches 109 while viewing the display unit 107, communication information is displayed on the display unit 107 in accordance with manipulation of the input switches 109 to thereby call the other party. As shown in FIG. 4, when the user lays the palm Tb of his or her hand, whose wrist wears the watch 101 thereon, on his or her ear E present on the side of the user's wrist mentioned, the fronts of the speaker unit 111 and the microphone unit 112 in which sound is let off and collected are directed toward his or her ear E and mouth M, respectively. Thus, the user can communicate with the other party in a natural posture without the necessity of bending in an unnatural manner his or her arm concerned with his or her wrist mentioned.

As described above, according to this wrist-worn communications apparatus, the speaker unit 111 is attached to the mount 119 that in turn is attached to the buckle 104 to which the bands 103 are connected at one end such that the speaker unit 111 faces in the transverse direction of the bands while the microphone unit 112 is attached to the mount 119 so as to face in the direction perpendicular to the surface of the bands 103. Thus, although the speaker unit 111 and the microphone unit 112 are provided close to each other in the predetermined place on the band 103, that is, on the mount 119 attached to the buckle 104, the occurrence of howling is prevented and the directivities of both the speaker unit 111 and the microphone unit 112 is ensured.

Two different speaker-microphone assemblies opposite in speaker unit's direction may be prepared such that if the user wants to wear the watch 101 on a desired one of his or her right and left wrists for communicating with the other party, he or she can select and engage a corresponding one of the two assemblies with the buckle 104 on the band 103 to thereby sufficiently ensure the directivities of both the speaker unit 111 and the microphone unit 112. Thus, the apparatus is easier to use.

When the watch 101 is worn on the user's wrist W by the bands 103, the speaker-microphone assembly "A" is disposed on the opposite side of the user's wrist W from the watch 101. Therefore, if the assembly "A" is attached to the band 103 so as to face in the same direction as the palm Tb of the user's hand concerned does, the user can direct the microphone unit 112 and speaker unit 111 toward his or her mouth M and ear E present on the side of the user's wrist mentioned, respectively, only by laying the palm Tb of his or her hand on that ear E of his or her. Thus, the user can communicate with the other party in a natural posture without bending in an unnatural manner the user's arm concerned with his or her wrist mentioned.

The watch 101 comprises the input switches 109 and the display unit 107 provided thereon necessary for communicating purposes and also incorporates the timepiece function therein. Thus, as described above, information such as time can be displayed on the display unit 107, so that the watch 101 can be worn on the user's wrist W for use, like the general wristwatch. In addition, information including communication information can be displayed on the display unit 107 of the watch 101 without removing the watch 101 from the user's wrist W. In addition, the user can operate the input switches 109 on the watch 101 while viewing the display unit 107 as in the general wristwatch to thereby ensure satisfactory communication. Thus, the apparatus is improved in handiness.

In addition, in this apparatus the speaker-microphone assembly "A" is attached removably to the band buckle 104. Thus, when the apparatus is not used as communications equipment, it can be removed from the buckle 104 and used as the general wristwatch. If only a mount 119 on which no speaker and microphone units 111 and 112 are provided is attached to the band buckle 104, it can be used as a kind of ornamental accessories interesting in design. Therefore, this apparatus is easy to use.

While in the embodiment the speaker unit 111 and the microphone unit 112 are illustrated as attached to the mount 119 so as to face in the transverse direction of the band 103 and in the direction perpendicular to the surface of the band 103, respectively, the present invention is not limited to this particular case. For example, the speaker and microphone units 111 and 112 may be attached directly to the bands 103 so as to have such directions as just mentioned above.

While in the embodiment the wrist-worn communications apparatus in which the watch 101 that comprises a timepiece function, a communication function and a display function is worn on the user's wrist by the bands 103 has been illustrated, the present invention is not limited to this particular case. For example, the present invention may be applicable to wrist-worn communications apparatus in which a device comprising a transceiver function, a display unit and an input unit is worn on the user's wrist with bands. Also, in this case the speaker-microphone assembly "A" comprising the mount 119 that houses the circuit board therein, and the speaker unit 111 and the microphone unit 112 attached to the mount may be attached removably to the band buckle 104.

As described above, the wrist-worn communications apparatus of the embodiment of FIGS. 1-4 comprises a device (watch 101); a band 103 for wearing the device on a user's wrist; a speaker unit 111 disposed at a predetermined position on the band 103 so as to face in the transverse direction of the band 103; and a microphone unit 112 disposed close to the speaker unit 111 on the band 103 so as to face in the direction perpendicular to a surface of the band 103.

Thus, according to this embodiment even though the speaker and microphone units are provided close to each other at the predetermined position on the band 103, howling is prevented from occurring. In addition, especially when it is worn on the user's wrist in use the microphone and speaker units can be directed toward the user's mouth and ear on the side of his or her wrist mentioned, respectively, to thereby ensure the directivities of both the speaker and the microphone.

The wrist-worn communications apparatus of the embodiment of FIGS. 1-4 comprises a speaker-microphone assembly "A" provided removably at the predetermined position on the band 103, the speaker-microphone assembly "A" comprising the speaker unit 111, the microphone unit 112 and a mount 119 on which the speaker unit 111 and the microphone unit 112 are mounted close to each other.

Thus, two different speaker-microphone assemblies "A" opposite in speaker unit's direction may be provided such that if the user wants to wear the watch 101 on a desired one of his or her right and left wrists for communicating with the other party, he or she can select and engage a corresponding one of the two assemblies with the band 103 to thereby sufficiently ensure the directivities of both the speaker unit 110 and the microphone unit 111. Thus, the apparatus is easy to use.

In the wrist-worn communications apparatus of the embodiment of FIGS. 1-4, when the device (watch 101) is worn on the user's wrist by the band 103, the speaker-microphone assembly "A" is on the opposite side of the user's wrist from the device 101.

According to this wrist-worn communications apparatus, when the speaker-microphone assembly is worn by the band on the user's wrist so as to face in the same direction as the palm of the user's hand concerned with his or her wrist mentioned and that palm of the user's hand is laid on his or her ear present on the side of that palm of the user's hand, the user can direct the fronts of the microphone and speaker units toward the user's mouth and ear present on that palm of the user, respectively. Thus, the user can communicate with the other party in a natural posture without the necessity of bending his or her arm in an unnaturally manner.

In the wrist-worn communications apparatus of the embodiment of FIGS. 1-4, the device (watch 101) comprises at least an input unit 109, a display unit 107 necessary for communicating purposes, and a timepiece unit.

According to this communications apparatus, since the device comprises the timepiece function it can display information such as time on the display unit. Therefore, it can be worn as a watch on the user's wrist like the general wristwatch. In addition, the user can cause the display unit to display information on communication, etc. The user can operate the input unit of the apparatus while viewing the display unit to thereby communicate with the other party without removing the apparatus from the user's wrist. Thus, the apparatus is easy to use.

Other embodiments of the communications apparatus according to the present invention will be described. The same portions as those of the first embodiment will be indicated in the same reference numerals and their detailed description will be omitted.

Second Embodiment

Referring to FIGS. 5-8, a second embodiment of the wrist-worn communications apparatus will be described.

Figure 5:
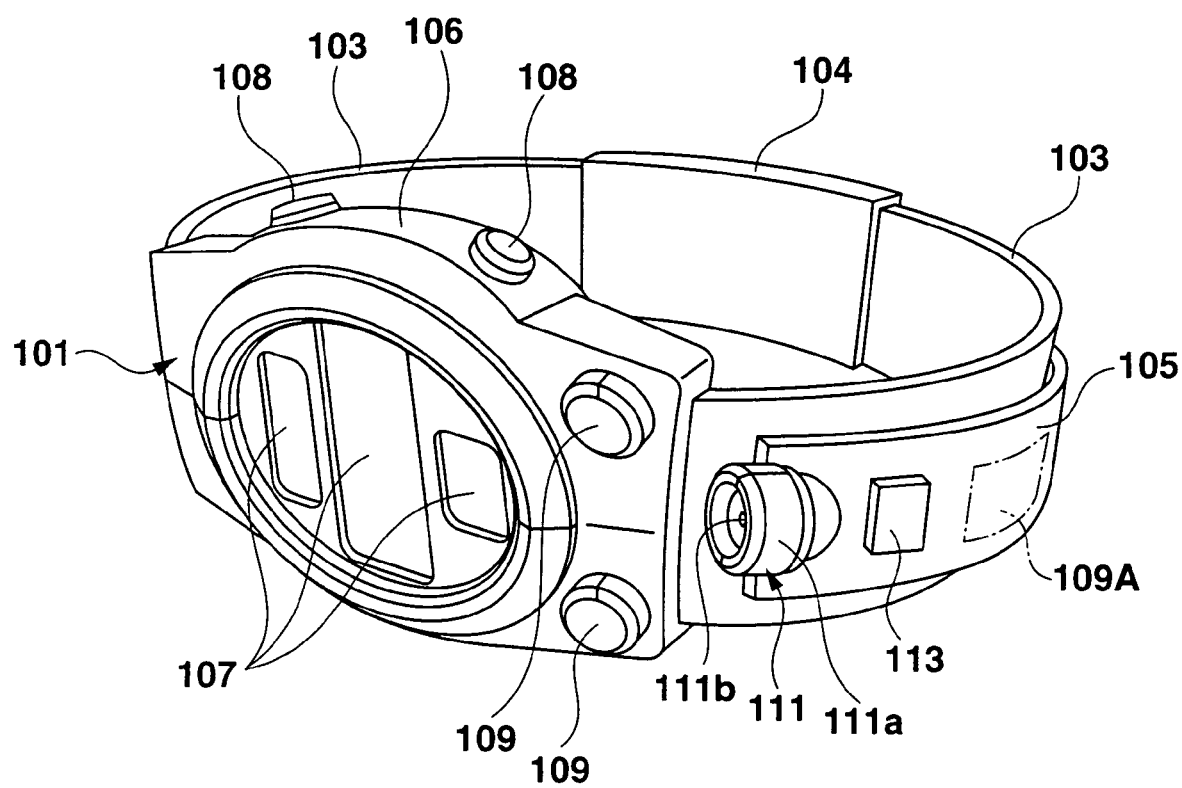
FIG. 5 is a perspective view of a second embodiment of the communications apparatus according to the present invention.
Figure 6:
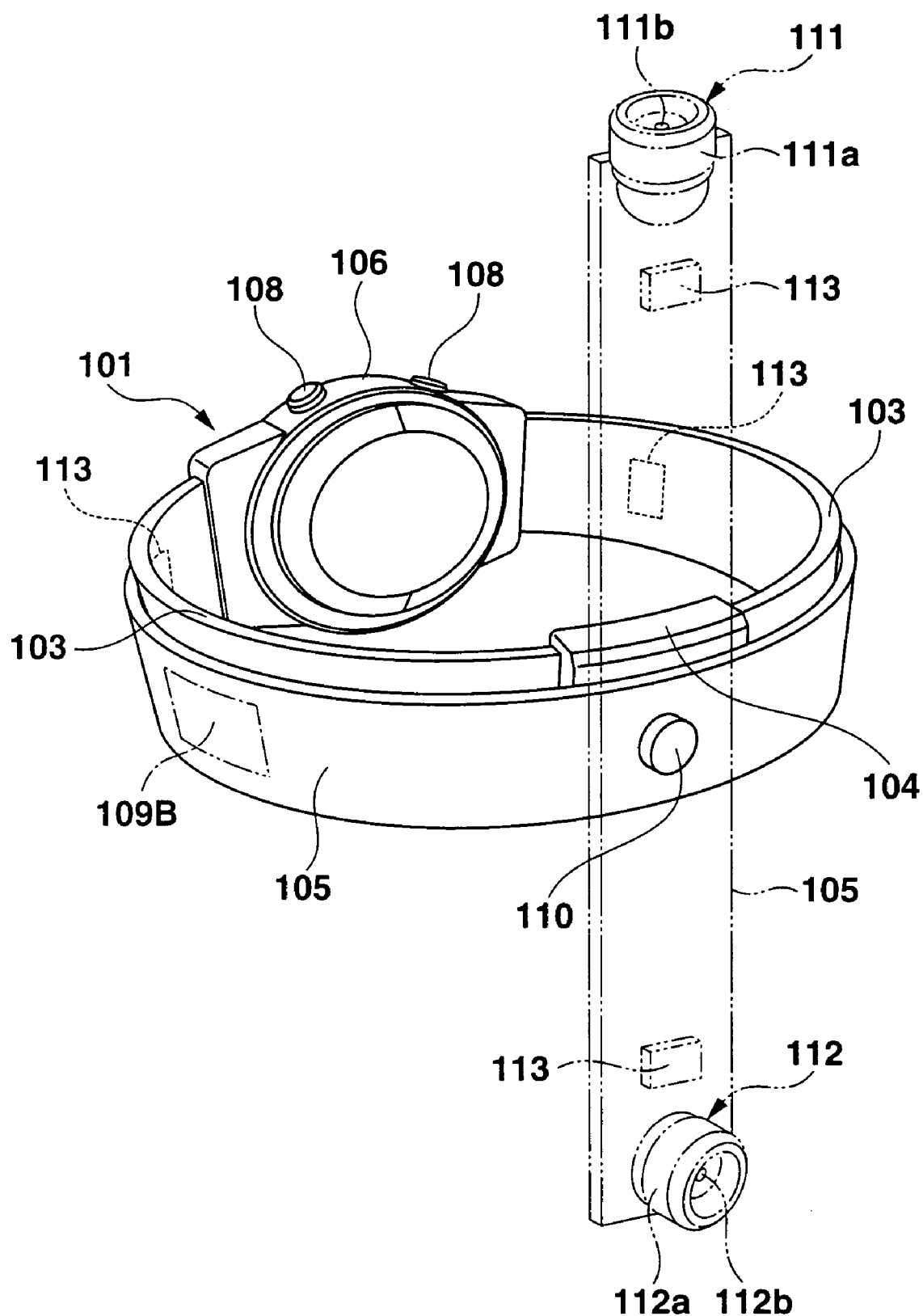
FIG. 6 is a perspective view of the communications apparatus of FIG. 5 as viewed from substantially the side of the back thereof.
Figure 7:
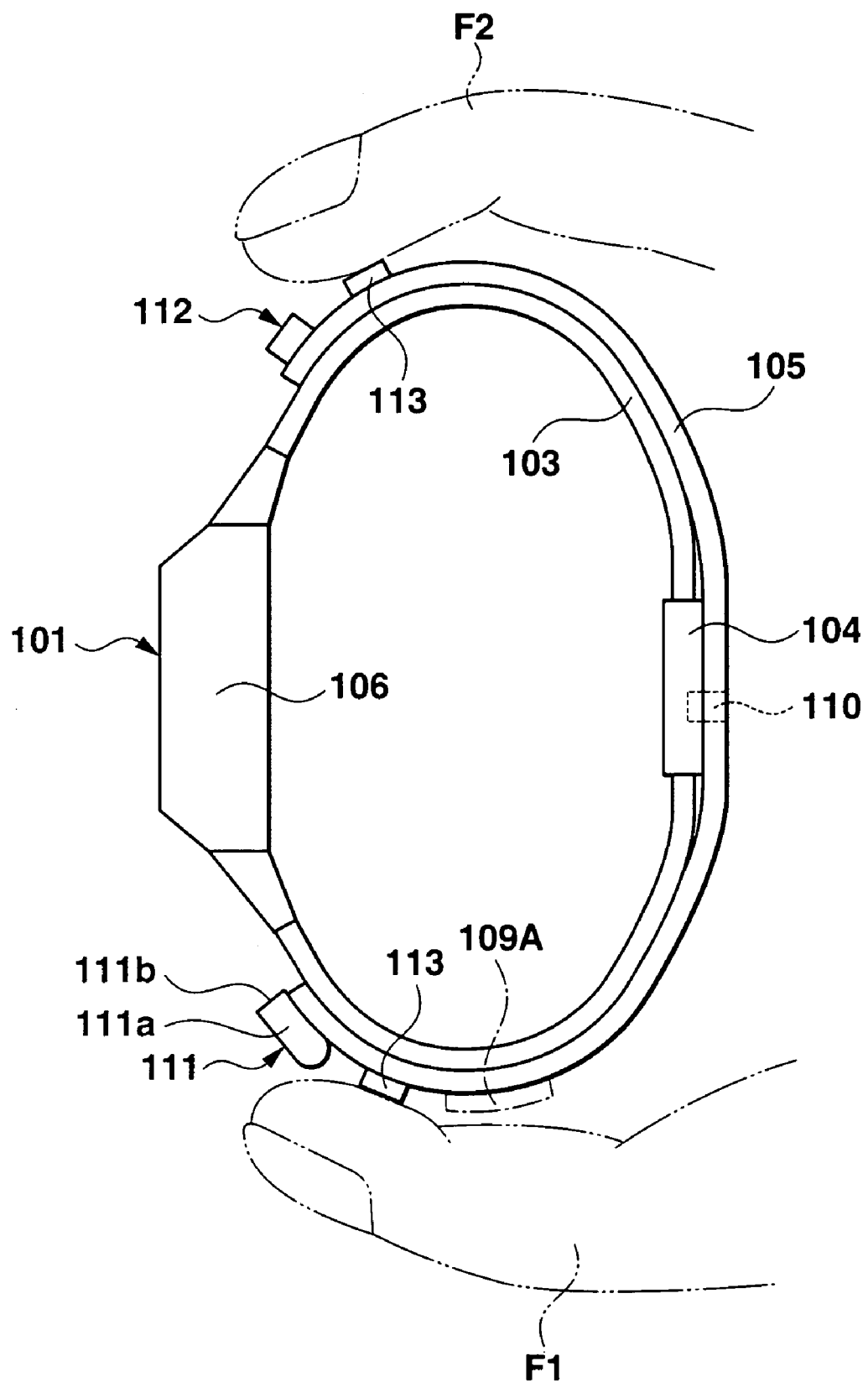
FIG. 7 is a side view of the apparatus of the second embodiment.
Figure 8:
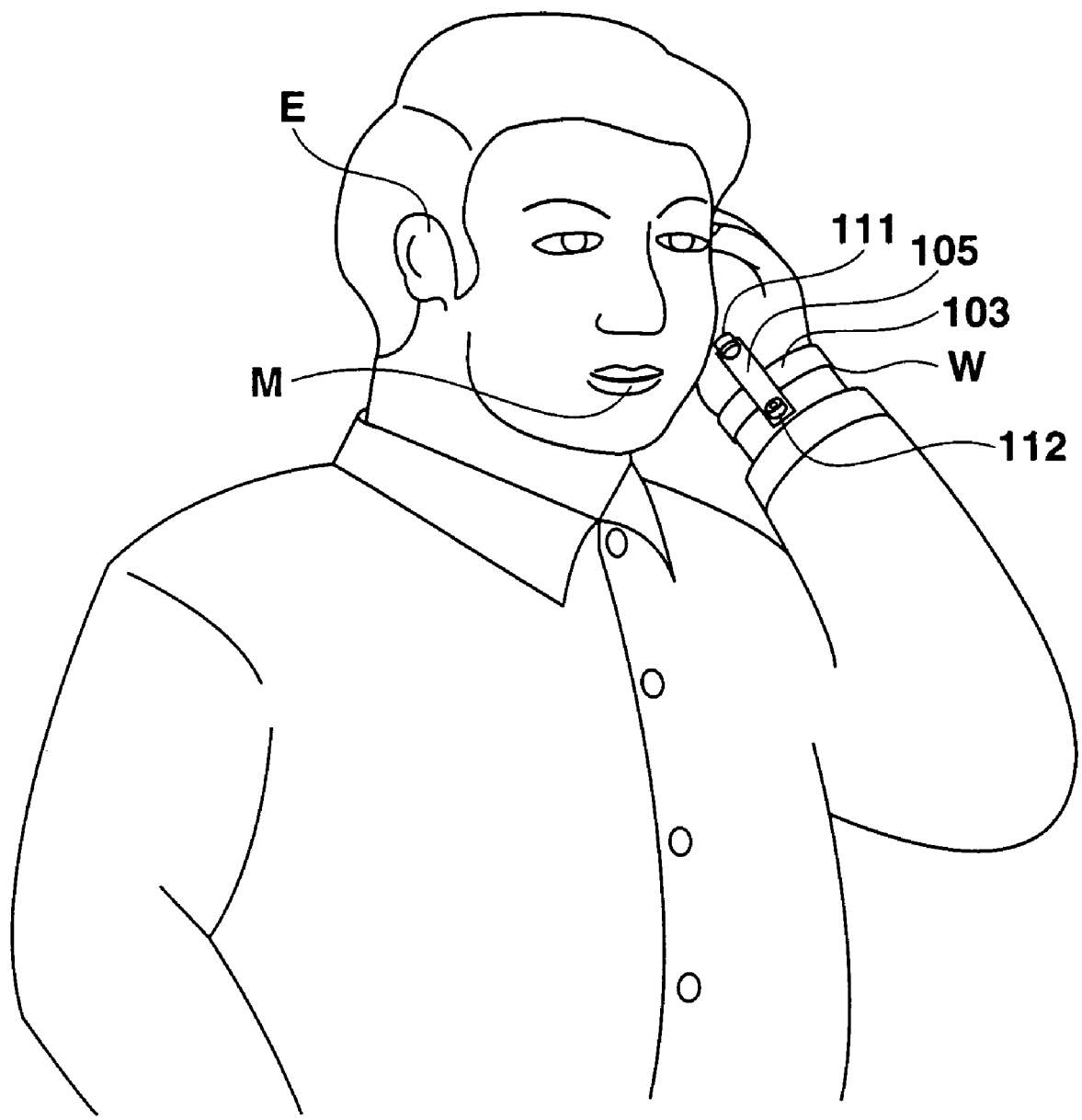
FIG. 8 illustrates use of the communications apparatus of FIG. 5.

FIG. 5 is a perspective view of this wrist-worn communications apparatus. FIG. 6 is a perspective view of the apparatus as viewed from substantially the side of the back thereof. FIG. 7 is a plan view of the communications apparatus. FIG. 8 illustrates use of the communications apparatus.

This communications apparatus comprises the watch 101, a pair of bands 103 that are attached at one end to the watch 101 at 12 o'clock and 6 o'clock, buckle 104 for connecting the bands disconnetably at the other end, and support member 105 attached turnable to the buckle 104.

As shown in FIG. 5, the watch 101 has the case 106 which contains the flat-type display unit 107 that comprises a liquid crystal display element or an electroluminescence element that displays various information such as time/communication data electro-optically, and various other electronic parts (not shown) such as, for example, a timepiece/transceiver circuit necessary for fulfilling timepiece and communication functions. The watch case 106 has on its side at 3 o'clock and 9 o'clock a plurality of push button switches 108 for time-correcting/mode-changing purposes. The watch case 106 also has a plurality of input switches 109 for communication use on its upper surface at 6 o'clock. These input switches 109 are arranged such that data such as phone numbers and e-mail messages are inputted appropriately by rotating/depressing the switches.

When the watch 101 is worn on the user's wrist W by a pair of bands 103, the buckle 104 is disposed on the opposite side of the user's wrist from the watch 101. As shown in FIGS. 6 and 7, the support member 105 is supported turnable at a pivot 110.

The support member 105 is made of the same material as the bands 103; that is, resilient plastic, for example, of urethane. The support member 105 has the form of a strip that can be superposed on the band 103 so as to extend in the same direction as the bands 103 do and also turned around the pivot 110 so as to extend across the band 103. As shown in FIGS. 5 and 6, the speaker unit 111 is provided on one end of the support member 105 so as to face outward in the extending direction of the support member 105. As shown in FIG. 6, the microphone unit 112 is provided on the other end of the support member 105 so as to face in the direction perpendicular substantially to a surface of the support member 105.

As shown in FIGS. 6 and 7, the speaker unit 111 comprises a speaker element (not shown) provided within the hollow cylinder 111a, which is provided on the one end of the support member 105 so as to face outward. The cylinder 111 has a closed outward end with the hole 111b toward which the speaker is directed. As shown by a two-dot-dashed line in FIG. 6, the microphone unit 112 comprises a microphone (not shown) housed within the hollow cylinder 112a provided so as to face in the direction perpendicular to the surface of the support member 105 with a closed upward end of the cylinder 112a having the hole 112b toward which the microphone is directed.

The speaker of the speaker unit 111 and the microphone of the microphone unit 112 are connected electrically by leads (not shown) extending through the support member 105, pivot 110 and bands 103 to an electronic circuit (not shown) provided within the watch 101. Thus, the speaker produces sound such as voice sound based on an electric signal from the watch 101 and lets it off outward through the hole 111b in the closed end of the cylinder 111a. The microphone unit 112 collects external sound such as voice sound through the hole 112b in the closed end of the cylinder 112a, converts the sound to an electric signal by the microphone and then outputs the signal to the watch 101.

As shown in FIGS. 6 and 7, lock buttons 113 are provided on opposite ends of the support member 105 so as to engage with receivers (not shown) provided on the bands 103 to thereby fix the support member 105 closely to the bands 3. When these lock buttons 113 are simultaneously depressed with the thumb F1 and first fingers F2 of the user's hand on which no watch 101 is worn, as shown in FIG. 7, these lock buttons 113 are disengaged from the receivers on the bands 103 to thereby unlock the support member 105 from the bands 103.

A method of using the wrist-worn communications apparatus according to this embodiment will be described next. In this case, like a general wristwatch, the watch 101 is worn on the user's wrist W by coupling the bands 103 around the user's wrist through the buckle 104 such that the watch 101 faces in the same direction as the back of the user's hand does and that the buckle 104 faces in the same direction as the user's palm does. Thus, this apparatus can be used as the general wristwatch as well as a cellular phone. In this state, information such as time displayed on the display unit 107 of the watch 101 can be recognized as in the general wristwatch.

When the user uses the apparatus as the cellular phone, the user dials the phone number of the other party by manipulating the input switches 109 while viewing the display unit 107. Thus, communication information such as the phone number is displayed on the display unit 107 and the other party is called. Then, as shown in FIG. 7, the user depresses the lock buttons 113 provided on the opposite ends of the support member 105 of the communications apparatus worn on one wrist of the user with his or her thumb and first fingers F1 and F2 of the user's other hand on whose wrist no watch 101 is worn. Thereupon, the respective lock buttons 113 are disengaged from the receivers on the bands 103 to thereby unlock the support member 105 from the bands 103. This allows the support member 105 to turn around the pivot 110.

Then, as shown by a two-dot-dashed line in FIG. 6, the support member 105 is turned around the pivot 110 so as to extend in the transverse direction of the bands 103. At this time, the speaker unit 111 is disposed in the vicinity of the palm of the user's hand concerned with his or her wrist mentioned while the microphone unit 112 is disposed at a position remote from that palm of the user's hand. As shown in FIG. 8, when the user lays that palm of the user's hand, whose wrist wears the watch 101 thereon, on his or her ear E present on the side of that palm of the user's hand, the fronts of the microphone unit 112 and speaker unit 111 are directed toward the user's mouth M and ear E present on the side of that palm of the user's hand, respectively. Thus, the user can communicate with the other party in a natural posture without the necessity of bending his or her arm in an unnatural manner. After the communication has ended, the user can turn the support member 105 around the pivot 110 so as to be superposed on the bands 103 in the same direction as the bands extends and then depress the lock buttons 113 so as to be engaged with the respective receivers on the bands 103. Therefore, the support member 105 is fixed on the bands 103 in a superposed state without becoming a hindrance and becomes portable.

As described above, according to this wrist-worn communications apparatus, the support member 105 is attached turnably around the pivot 110 to the band buckle 104. The speaker unit 111 and the microphone unit 112 are attached to the respective opposite ends of the support member 105. Thus, even when the watch 101 is worn on the user's wrist W by the bands 103, the speaker unit 111 and the microphone unit 112 are easily directed toward the user's ear E and mouth M, respectively, by turning the support member 105 around the pivot 110 so as to extend in the transverse direction of the bands 103.

Especially, the speaker unit 111 is provided on one end of the support member 105 so as to face outward in the extending direction of the support member 105 while the microphone unit 112 is provided on the other end of the support member 105 so as to face in the direction perpendicular to the surface of the support member 105. Thus, even when the user brings his or her mouth M close to the microphone unit 112, it is ensured that the front of the speaker unit 111 is directed toward the user's ear E. Thus, whether or not the support member 105 is long, the directivities of both the speaker unit 111 and the microphone unit 112 are sufficiently ensured. If the support member 105 is long, the speaker unit is spaced sufficiently from the microphone unit 112. Thus, the occurrence of so-called howling is prevented in which the microphone unit 112 will pick up sound produced by the speaker 111.

When the watch 101 is worn on the user's wrist W by the bands 103 and the support member 110 is then turned around the pivot 110 so as to extend in the transverse direction of the bands 103, the support member 105 is disposed on the opposite side of the user's wrist from the watch 101. Thus, if the support member 105 is attached to the bands so as to face in the same direction as the palm of the user's hand concerned with his or her wrist mentioned does, the user can direct the fronts of the microphone unit 112 and speaker unit 111 toward his or her mouth M and ear E present on the side of that palm of the user, respectively, only by laying that palm of his or her hand on that ear E of the user. Thus, the user can communicate with the other party in a natural posture without the necessity of bending in an unnatural manner his arm concerned with his or her wrist mentioned.

The support member 105 is attached turnably around the pivot 110 to the buckle 104. Thus, the support member 105 can be turned around the pivot 110 so as to extend in either of the transverse and extending directions of the band 103 does. In addition, especially when the watch 101 worn on one of the user's right and left wrists is reworn and used on the other of the user's right and left wrists, the support member 105 should be turned through 180 degrees to thereby reverse the positions of the speaker unit 111 and the microphone unit 112 relative to the band 103. Even in the use of the apparatus on either of the user's right and left wrists, the directivities of both the speaker unit 111 and the microphone unit 112 are sufficiently ensured to thereby make the apparatus easy to use.

Since the support member 105 has the form of a strip superposable on the bands 103 in the extending direction of the bands, the support member 105 can be well portable without being a hindrance by turning the support member 105 around the pivot 110 so as to be superposed on the bands. Especially, the lock buttons 113 provided on the opposite ends of the support member 105 can lock the support member 105 unlockably on the bands 103 in a state in which the support member 105 is superposed on the bands. Thus, although the support member 105 is long, it can be fixed securely to the bands 103 closely. Thus, it cannot be a hindrance and the communications apparatus becomes further well portable.

Figure 9:
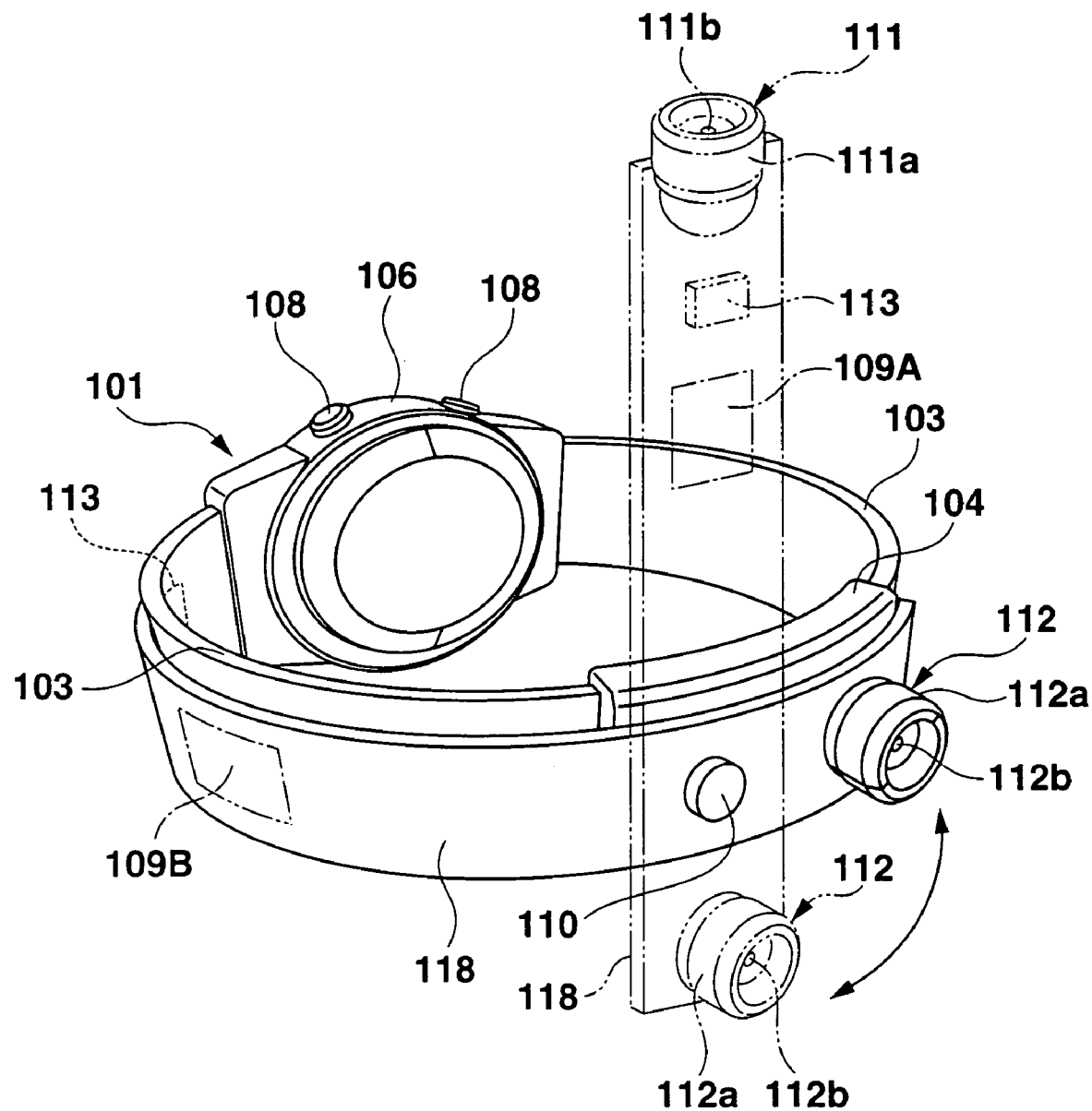
FIG. 9 is a perspective view of a modification of the second embodiment.

While in the second embodiment the support member 105 attached at substantially its midpoint by the pivot 110 to the band buckle 104 with the lock buttons 113 provided on the opposite ends of the support member 105 has been illustrated, the present invention is not limited to this particular case. For example, as shown in FIG. 9, the support member 118 may be pivoted at the pivot 110 to the band buckle 104 in the vicinity of the microphone unit 112. In this case, no lock buttons 113 need be provided on the support member 118 in the vicinity of its opposite ends. Only one lock button 113 may be provided on the support member 118 in the vicinity of the speaker unit 111. In this structure when the support member 118 is superposed on the bands 103 so as to extend in the extending direction of the bands 103, the end of the support member 118 on the microphone unit 112 side is placed in close contact with the band buckle 104 by the pivot 110. Thus, the support member 118 may be fixed by the lock button 113 to the band 103 in the vicinity of the speaker unit 111.

As shown by a dot-dashed line of FIG. 9, one of key-in units 109A and 109B may be provided on the corresponding one of the band 103 and the support member 118 in place of the input switches 109 that input communication information such as telephone numbers and e-mail messages. Thus, in order to perform telephonic or e-mail communication with the other party, the user can easily manipulate the key-in unit 109A or 109B well while viewing the display unit 107 after removing the support member 105 from the bands 3 or superposing the support member 105 on the bands 103 in their extending direction. Thus, the apparatus is easy to handle.

Third Embodiment

Next, referring to FIGS. 10 and 11, a third embodiment of the wrist-worn communications apparatus will be described. The same reference numeral is used to denote the same element in the third and second embodiments of FIGS. 10, 11 and FIGS. 5-9.

This communications apparatus has the substantially same structure as the second embodiment except that in the apparatus of the third embodiment a communications unit 120 is provided on an outer surface of the buckle 104 for the bands 103 that wears the watch 101 on the user's wrist W with a lid 121 connected by a hinge 122 to an upper edge of the communications unit 120 so that the lid 121 of the communications unit 120 can be opened and closed in the opposite transverse directions of the bands 103.

The communications unit 120 comprises a key-in unit 123 and a microphone unit 124. The key-in unit 123 comprises a power source key, a talk key, character keys, and function keys necessary for fulfilling communication functions. These keys are arranged such that characters marked on the respective keys are arranged in a normal posture in rows in the transverse direction of the bands 103. The microphone unit 124 is provided on the face of the communications unit on the opposite side of the key-in unit 123 from the hinge 122.

Figure 11:
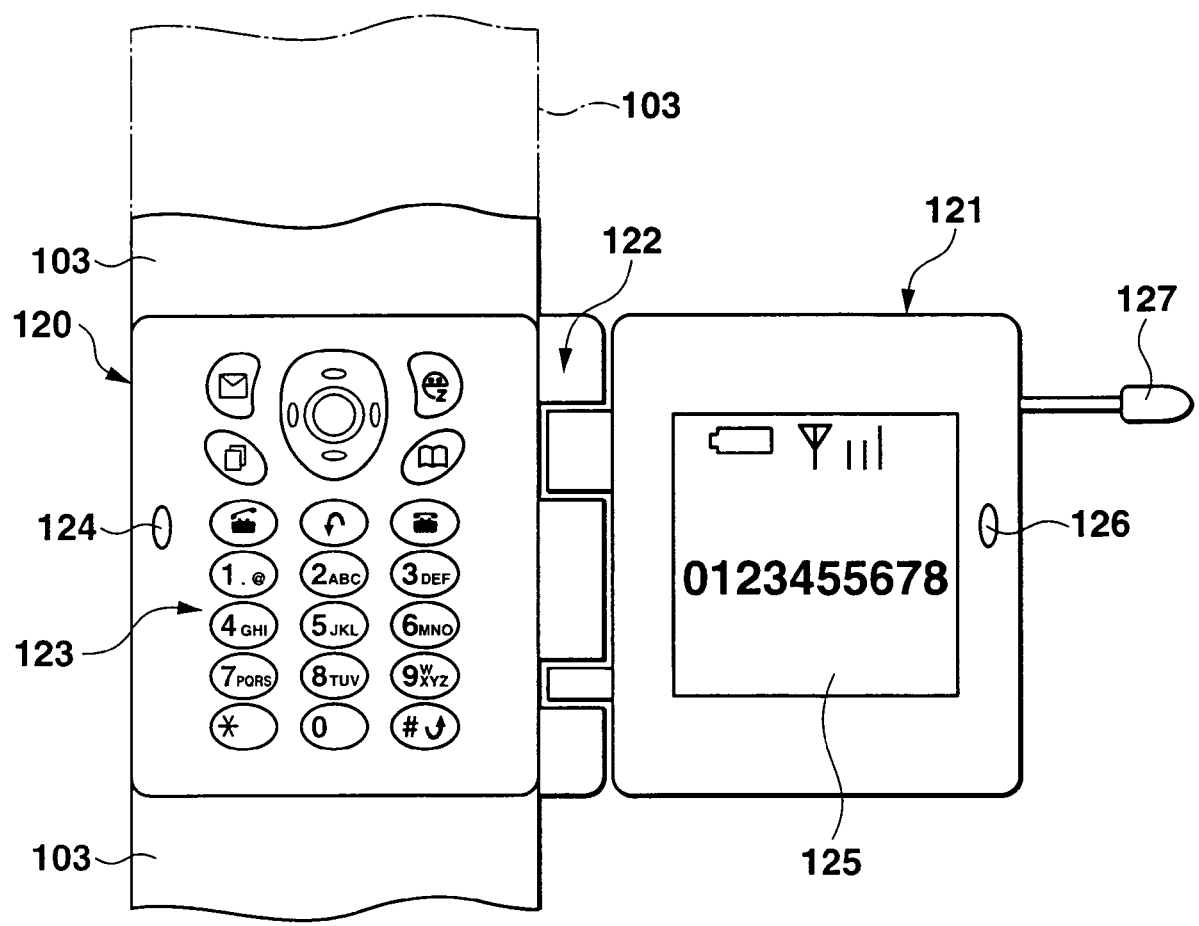
FIG. 11 is an enlarged front view of the communications unit of the communications apparatus of FIG. 10 with its lid open.

A display unit 125 and a speaker unit 126 are provided on the inner surface of the lid 121 as shown in FIG. 11. The display unit 125 comprises a liquid crystal display element or an electroluminescence element like the display unit 107 of the watch 101 that also disposes and displays characters composing communication information such as phone numbers and messages in a normal posture in the transverse direction of the bands 103, as in the key-in unit 123. The speaker unit 126 is provided on the inner surface of the lid 121 on the opposite side of the display unit 125 from the hinge 122 such that when the lid 121 is closed, the speaker unit 126 is placed in the vicinity of the microphone unit 124 whereas when the lid 121 is opened, the speaker unit 126 is placed at the remotest position from the microphone unit 124 with the hinge 122 therebetween. An antenna 127 is housed within the lid 121 so as to be extensible outward in the transverse direction of the bands 103.

A method of using this wrist-worn communications apparatus will be described next. In this case, like the second embodiment when the watch 101 is worn on the user's wrist W by connecting the bands 103 such that the watch 101 faces in the same direction as the back of the user's hand concerned with his or her wrist does, and that the buckle 104, the communications unit 120 and the lid 121 face in the same direction as the user's palm does. Thus, this apparatus can be used as a general wristwatch. In this state, information such as time displayed on the display unit 107 of the watch 101 can be recognized as in the general wristwatch.

When this apparatus is used as a cellular phone, the lid 121 of the communications unit 120 is opened through the hinge 122 in the transverse direction of the bands 103, as shown in FIG. 11. Thus, the key-in unit 123 and the microphone unit 124 of the communications unit 120 and the display unit 125 and the speaker unit 126 of the inner surface of the lid 121 are exposed. When in this state the user horizontally holds before him or her his or her arm on whose wrist the watch 101 is worn such that the palm of the user's hand concerned with his or her wrist mentioned faces upward, the key-in unit 123 and the display unit 125 are placed such that the characters marked on the respective keys of the key-in unit 123 and characters, for example, of a phone number and/or an e-mail message displayed on the display unit 125 are arranged in a normal posture. Therefore, the user can easily view the key-in unit 123 and the display unit 125. When the user pulls the antenna 127 out from the lid 121 and dials the other party number at the key-in unit 123 while viewing the display unit 125, communication information such as the phone number is displayed on the display unit 125 and also the other party is called.

When the user brings the palm of his or her hand, whose wrist wears the communications unit 120 thereon, close to his or her ear present on the side of that palm of his hand, the fronts of the microphone unit 124 of the communications unit 120 and the speaker unit 126 of the lid 121 are directed toward the user's mouth and ear present on the side of that palm of his hand, respectively. Thus, the user can communicate with the other party in a natural posture without the necessity of bending in an unnatural manner his or her arm concerned with his or her wrist mentioned. When the communication ends, the user retracts the antenna 127 into the lid 121 and closes the face of the communications unit 120 with the lid 121 through the hinge 122. In this case, the display unit 125 is completely superposed on the key-in unit 123 so as to face the key-in unit 123. Thus, the lid 121 does not become a hindrance and protects the key-in unit 123 and the display unit 107 from being damaged. The apparatus becomes portable well.

As described above, according to this communications apparatus, the communications unit 120 comprising the key-in unit 123 is provided on the buckle 104 of the bands 103 that wear the watch 101 on the user's wrist W. The communications unit 120 has the lid 121 that in turn has the display unit 125 thereon with the lid openable through the hinge 122. The microphone unit 124 is provided on the face of the communications unit 120 on the opposite side of the key-in unit 123 from the hinge 122. The speaker unit 126 is provided on the lid 121 on the opposite side of the display unit 125 from the hinge 122. Thus, when the communications unit 120 is used with the lid 121 open, the microphone unit 124 is spaced sufficiently from the speaker 126 to thereby prevent the occurrence of howling by the microphone 124. The speaker unit 126 and the microphone unit 124 can be directed toward the user's ear selected and the mouth, respectively, to thereby ensure the directivities of both the speaker unit 126 and the microphone 124.

According to this communications apparatus, the hinge 122 is provided at the edge of the communications unit 120 which coincides with the edge of the band 103 substantially such that the lid 121 is opened and closed through the hinge 122 in the opposite transverse directions of the bands 103. Thus, if the watch 101 is worn on the user's wrist W so as to face in the same direction as the palm of the user's hand concerned as in the second embodiment, the communications unit 120 is disposed on the user's palm side. When in this state the user opens the lid 121 and then brings that palm of his or her hand toward his or her ear present on the side of that palm of the user's hand, the fronts of the microphone unit 124 and the speaker unit 126 are directed toward the user's mouth and ear present on the side of that palm of the user's hand, respectively. Thus, the user can communicate with the other party in a natural posture without the necessity of bending his or her arm in an unnatural manner. Thus, the apparatus is easy to handle.

Fourth Embodiment

Figure 12:
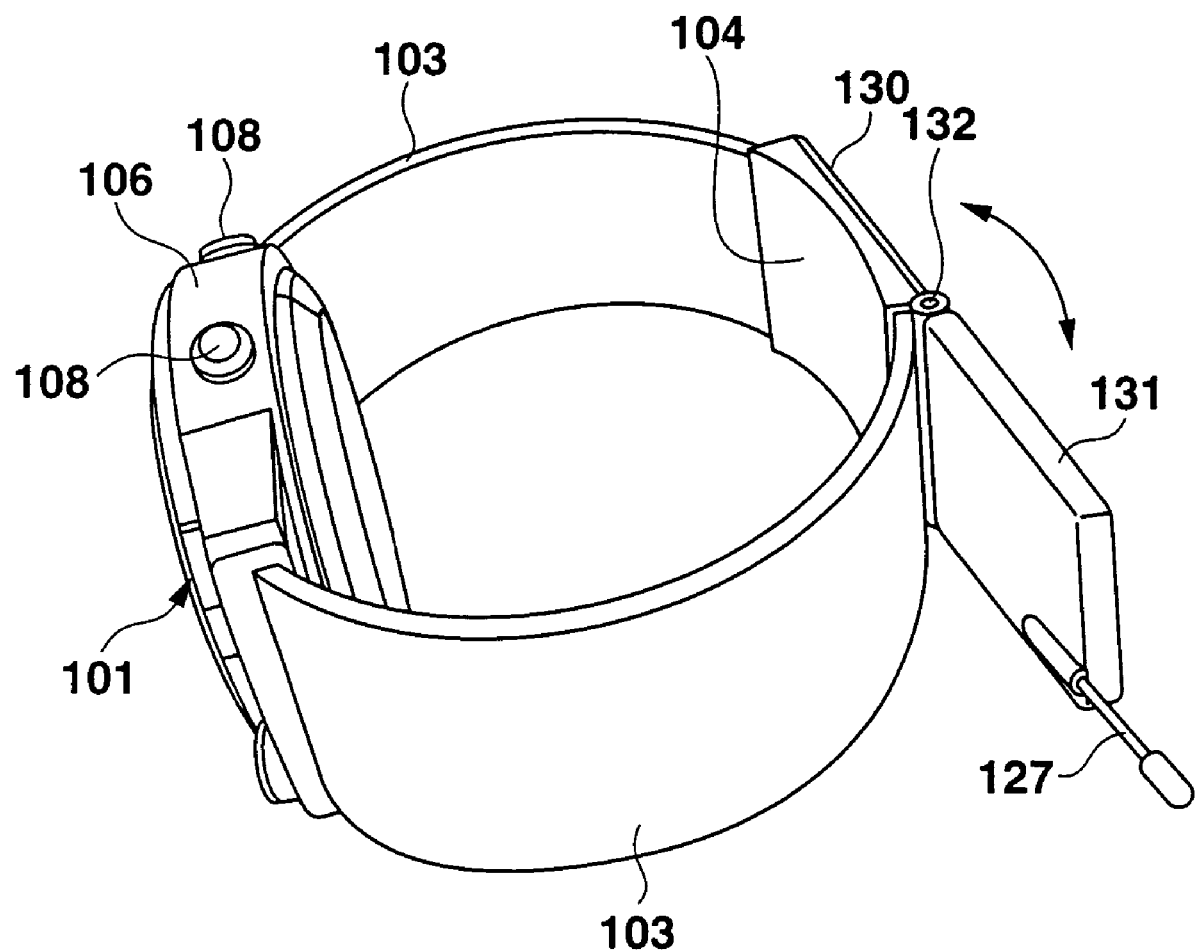
FIG. 12 is a perspective view of a fourth embodiment of the communications apparatus according to the present invention with the lid for its communications unit being open.

Next, referring to FIGS. 12 and 13, a fourth embodiment of the wrist-worn communications apparatus will be described. The same reference is used to denote the same element of the fourth and the second embodiments of FIGS. 12, 13 and 5, 6.

This apparatus has substantially the same structure as that of the second embodiment except that a lid 131 is connected at one side edge by a hinge 132 to a side (upper edge in FIG. 13) of a communications unit 130 perpendicular to the extending direction of the bands and provided on the band buckle 104 such that the lid 131 can be turned around the hinge 132 in the extending direction of the bands 103 to open or close the communications unit 130.

Figure 13:
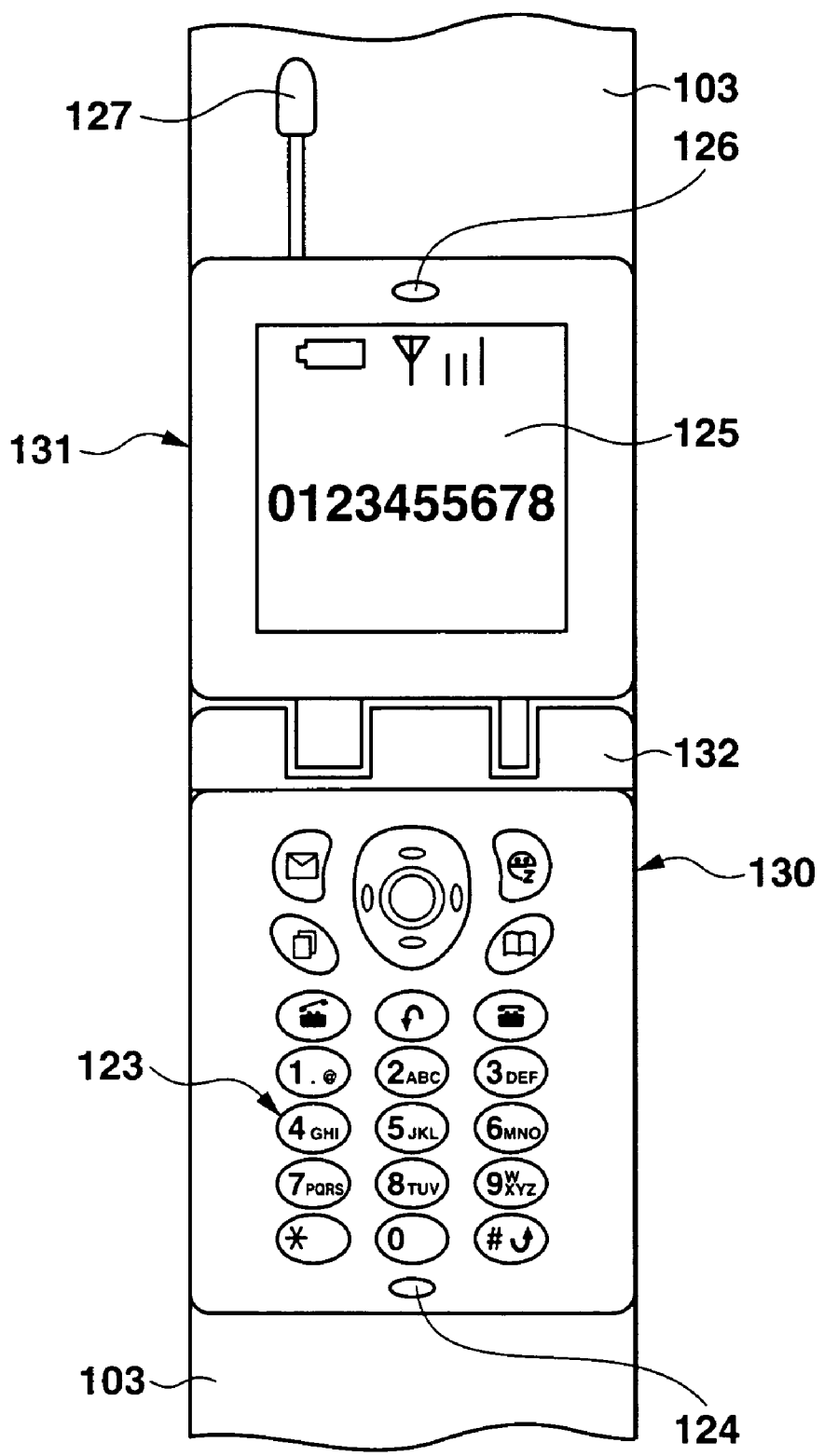
FIG. 13 is an enlarged front view of the communications unit of the communications apparatus of FIG. 12 with its lid open.

As in the second embodiment, the key-in unit 123 and the microphone unit 124 are provided on the face of the communications unit 130, as shown in FIG. 13. The key-in unit 123 comprises a power source key, a talk key, character keys, and function keys necessary for fulfilling the communication functions. Those keys are arranged in rows such that the characters marked on them can be arranged in a normal posture in the transverse direction of the bands 103. The microphone unit 124 is provided on the face of the communications unit 130 on the opposite side of the key-in unit 123 from the hinge 132 (below the key-in unit 123 in FIG. 13). When the lid 131 is closed, it is superposed on the communications unit 130 whereas when the lid 131 is opened to expose the face of the communications unit 130, it is superposed on the bands 103 in their extending direction.

The display unit 125 and the speaker unit 126 are provided on the inner surface of the lid 131. As in the third embodiment, the display unit 125 comprises a liquid crystal display element or an electroluminescence element that arranges and displays characters representing phone numbers, call messages, etc., in a normal posture in the transverse direction of the bands 103 as in the key-in unit 123. The speaker unit 126 is provided on the inner surface of the lid 131 on the opposite side of the display unit 125 from the hinge 132. When the lid 131 is closed, the speaker unit 126 faces the microphone unit 124 whereas when the communications unit 130 face is opened, the speaker unit 126 is placed at a position remotest from the microphone 124. An antenna 127 is housed within the lid 131 so as to extensible outward in the extending direction of the band 103.

The fourth embodiment of the wrist-worn communications apparatus produces beneficial effects similar to those produced by the third embodiment. Especially, the lid 131 connected through the hinge 132 to the communications unit 130 provided on the band buckle 104 is adapted to be opened or closed in one or the other of the opposite extending directions of the bands 103. Thus, when the lid 131 is opened to use the communications unit 130 worn on the user's wrist W, the lid 131 is superposed on the bands 103. When the user's wrist W on which the communications unit 130 is worn is supported horizontally before the user, the key-in unit 123 and the display unit 125 are disposed in the vertical direction such that the characters marked on the respective keys of the key-in unit 123 and representing the information displayed on the display unit 125 are arranged in an normal position as in the second embodiment. Thus, the key-in unit 123 and the display unit 125 are easily recognized and manipulated.

While in the third and fourth embodiments the key-in unit 123 of the communications unit 120 or 130 and the display unit 125 of its lid 121 or 131 are illustrated as disposed such that characters marked on the respective keys of the key-in unit 123 and representing the information displayed on the display unit 125 of its lid 121 or 131 are arranged in a normal posture in the transverse direction of the bands 103, the present invention is not limited to these cases. For example, the key-in unit 123 of the communications unit 120 or 130 and the display unit 125 of its lid 121 or 131 may be arranged on the bands 103 in their extending directions such that characters marked on the respective keys of the key-in unit 123 and representing the information displayed on the display unit 125 are arranged in a normal posture in the extending direction of the bands 103. In this case, the user's wrist W on which the communications unit 120 or 130 is worn by the bands 103 is held vertically before the user such that the communications unit 120 or 130 and its lid 121 or 131 face in the same direction as the user's palm. Thus, the characters marked on the respective keys of the key-in unit 123 and representing the information displayed on the display unit 125 are arranged in a normal posture and the key-in unit 123 and the display unit 125 can be easily recognized and manipulated by the user as in the third and fourth embodiment.

Fifth Embodiment

Figure 14:
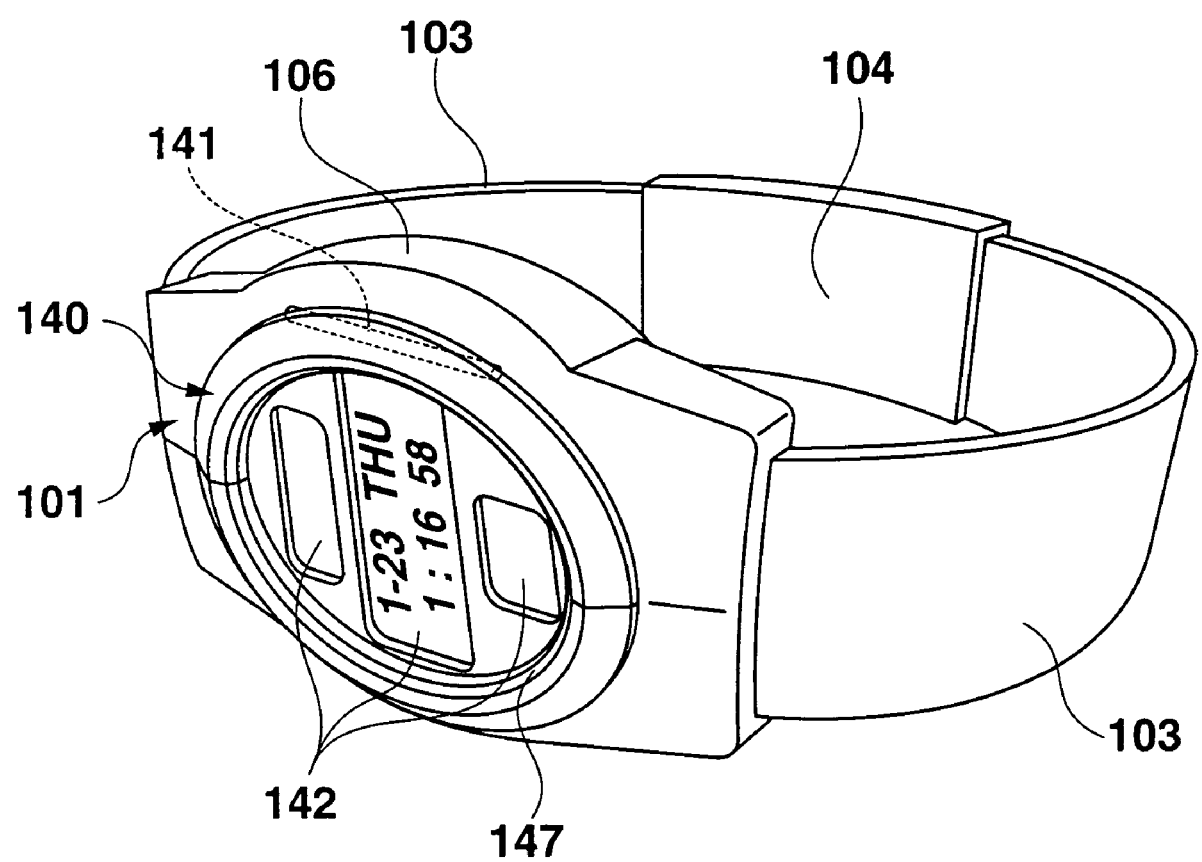
FIG. 14 is a perspective view of a fifth embodiment of the communications apparatus according to the present invention.

Then, referring to FIGS. 14 and 15, a fifth embodiment of the wrist-worn communications apparatus will be described. The same reference numeral is used to denote the same element of the fifth embodiment of FIGS. 14 and 15 and the third embodiment of FIGS. 5-9.

This apparatus comprises the watch 101 that has the timepiece and communication functions. As shown in FIGS. 14 and 15, the watch 101 has a substantially circular lid 140 connected through a hinge 141 in the vicinity of its upper edge to the case 106 so as to be turnable in the transverse direction of the bands. The lid 140 has a first display unit 142 for a timepiece and a second display unit 143 for communicating purpose provided on the front and back, respectively, of the lid 140. The display unit 142 is covered with a crystal 147. The case 106 contains therein a timepiece circuit and a communication circuit (not shown). A key-in unit 144 is provided on the watch case 106 coverable with the lid 140.

Figure 15:
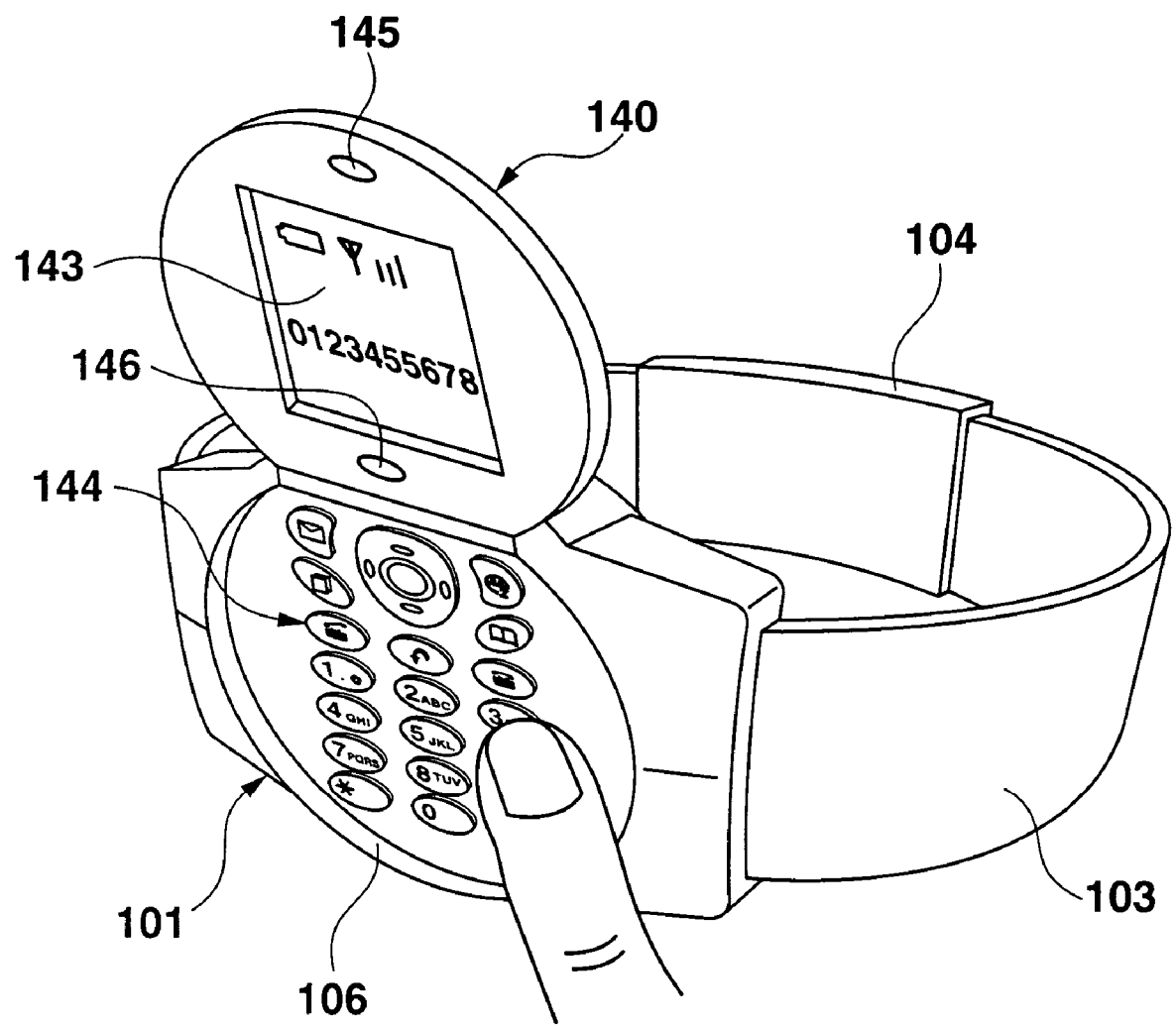
FIG. 15 is a perspective view of the communications apparatus of FIG. 14 with its lid open.

As shown in FIG. 15, in addition to the second display unit 143 a speaker unit 145 and a microphone unit 146 are provided on the back or inner surface of the lid 140.

The first and second display units 142 and 143 each comprise a flat-panel type display element, for example, of a liquid crystal display or electro-luminescence element. The first display unit 142 displays characters indicating information such as time arranged in a normal posture in the transverse direction of the bands 103 as in the general wristwatch. The second display unit 143 displays characters indicating information such as a phone number and a call message arranged in a normal posture in the extending direction of the band 103, or in the perpendicular to the character indicating direction of the first display unit 142. The speaker unit 145 is provided on the opposite side of the second display unit 143 from the microphone unit 146 (above the second display unit 143 in FIG. 15). The microphone unit 146 is provided on the lid 140 in the vicinity of the hinge 141 (in the vicinity of the lower lid edge in FIG. 15).

As in the second embodiment, a key-in unit 144 in the case 106 comprises a power source key, a talk key, character keys and function keys necessary for fulfilling the communication functions. The keys are arranged in rows such that characters marked on those keys are arranged in rows in a normal posture in the extending direction of the band 103, or in the same direction as the characters representing the information displayed on the second display unit 143 of the lid 140 are arranged. The key-in unit 144 is connected electronically with an electronic circuit board (not shown) of a timepiece circuit and a communication circuit incorporated into the case 106. The circuit board is electrically connected by leads (not shown) to the first and second display units 142 and 143, the speaker unit 145, and the microphone unit 146 through the hinge 141.

When this apparatus is used, its watch 101 is worn on the user's wrist W by the bands 103 and their buckle 104 as in the second embodiment. Thus, this apparatus can be used as a general wristwatch as well as a cellular phone. As shown in FIG. 14, when the key-in unit 144 on the watch case 106 is covered by the lid 140, the first display unit 142 appears on the front of the lid 140. Thus, the user can view and know information such as time displayed on the first display unit 142 as in the general wristwatch.

When this apparatus is used as a cellular phone, the user wears the watch 101 on his or her wrist such that the watch 101 faces in the same direction as the palm of the user's hand concerned with his or her wrist mentioned does and supports vertically before him or her his or her arm concerned with his or her wrist mentioned. Then, when the user opens the lid 140 in the transverse direction of the bands 103, as shown in FIG. 15 the speaker 145, the second display unit 143 and the microphone 146 on the inner surface of the lid 140 are exposed in this order above the key-in unit 144 of the case 106. The characters marked on the respective keys of the key-in unit 144 and representing the information displayed on the second display unit 143 are arranged in a normal posture, as viewed from the user. Thus, the key-in unit 144 and the second display unit 143 are easy for the user to view and manipulate. Thus, when the user manipulates the key-in unit 144 to dial the other party number while viewing the second display unit 143, communication information such as a phone number is displayed on the second display unit 143 and the other party is then called.

When the user brings the palm of his or her hand, whose wrist W wears the watch 101 (FIG. 16), close to his or her ear present on the side of that palm of the user's hand, the fronts of the microphone unit 146 and speaker unit 145 are directed toward the user's mouth and ear present on the side of the palm of his or her hand, respectively. Thus, the user can talk with the other party in a natural posture without the necessity of bending in an unnatural manner his or her arm concerned with his or her wrist mentioned. When the user terminates the communication and closes the lid 140, the lid 140 is superposed on the watch case 106 with the second display unit 143 facing the key-in unit 144. Thus, the lid 140 does not become a hindrance and the communications apparatus becomes portable with the key-in unit 144 and the second display unit 143 protected from damage.

As described above, when the user communicates with the other party using the communications apparatus whose watch 101 is worn on his or her wrist W by the bands 103, he or she opens the lid 140 through the hinge 141 from the watch case 106. Thus, the key-in unit 144 housed within the case 106 and the second display unit 143 on the internal surface of the lid 140 are exposed. Therefore, the user can manipulate the key-in unit 144 while viewing the second display unit 143. The lid 140 is opened in the transverse direction of the bands 103. Thus, when the user wears the watch 101 on his or her wrist so as to face in the same direction as the palm of the user's hand concerned, the user can direct the fronts of the microphone unit 146 and speaker unit 145 toward the user's mouth and ear present on that palm of the user, respectively, by laying that palm of the user's hand on that ear of the user in a natural posture without the necessity of bending in an unnatural manner his or her arm concerned with his or her wrist mentioned. Thus, the directivities of both the speaker unit 145 and the microphone unit 146 are ensured to thereby achieve satisfactory communication.

Sixth Embodiment

Then, referring to FIGS. 16 and 17, a sixth embodiment of the wrist-worn communications apparatus will be described. The same reference numeral is used to denote the same element of the sixth embodiment of FIGS. 16 and 17 and the fourth embodiment of FIGS. 12 and 13.

The communications apparatus of this embodiment has substantially the same structure as the fourth embodiment except that in the communications apparatus of the sixth embodiment the substantially rectangular lid 140 is connected openable through the hinge 141 to the case 106 of the watch 101 with an antenna 147 housed within a cavity in the lid 140 so as to be extensible outward in the transverse direction of the band 103. A microphone unit 146 is provided on the watch case 106.

More particularly, the microphone unit 146 is provided on the case 106 on the opposite side of the key-in unit 144 from the hinge 141 (below the key-in unit 144 in FIG. 17). The speaker 145 is provided on the lid 140 on the opposite side of the second display unit 143 from the hinge 141. When the lid 140 closes the key-in unit 144, the microphone unit 146 faces the speaker unit 145 whereas when the lid 140 is opened, the microphone unit 146 is placed at a position remotest from the speaker unit 145 with the hinge 141 between them. The microphone unit 146 is electrically connected to the circuit board (not shown) housed within the case 106. The antenna 147 is also connected electrically by leads (not shown) along with the first and second display units 142 and 143 and the speaker unit 145 to the circuit board.

This communications apparatus also produces beneficial effects similar to those produced by the fourth embodiment. Especially, the speaker unit 145 is disposed on the lid 140 on the opposite side of the second display unit 143 from the hinge 141 (above the second display unit 143 in FIG. 17) whereas the microphone unit 146 is provided on the watch case 106 on the opposite side of the key-in unit 144 from the hinge 141 (below the key-in unit 144 in FIG. 17). Thus, when the lid 140 is opened the speaker unit 145 is sufficiently spaced from the microphone unit 146 to thereby ensure prevention of howling by the microphone unit 146 and hence provide satisfactory telephonic communication.

Seventh Embodiment

Figure 17:
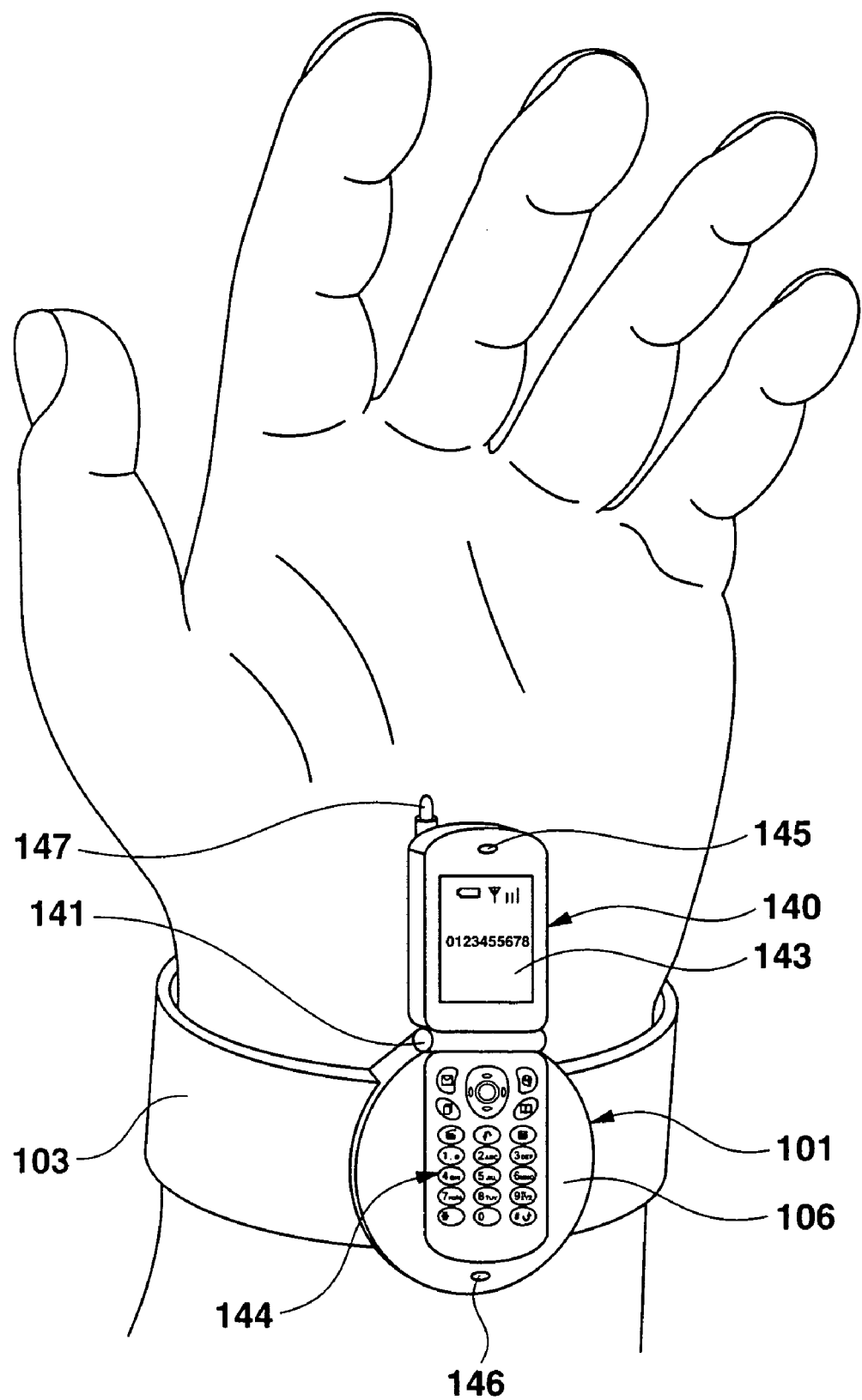
FIG. 17 is a perspective view of the communications apparatus of FIG. 16 worn on the user's wrist with its lid open.
Figure 18:
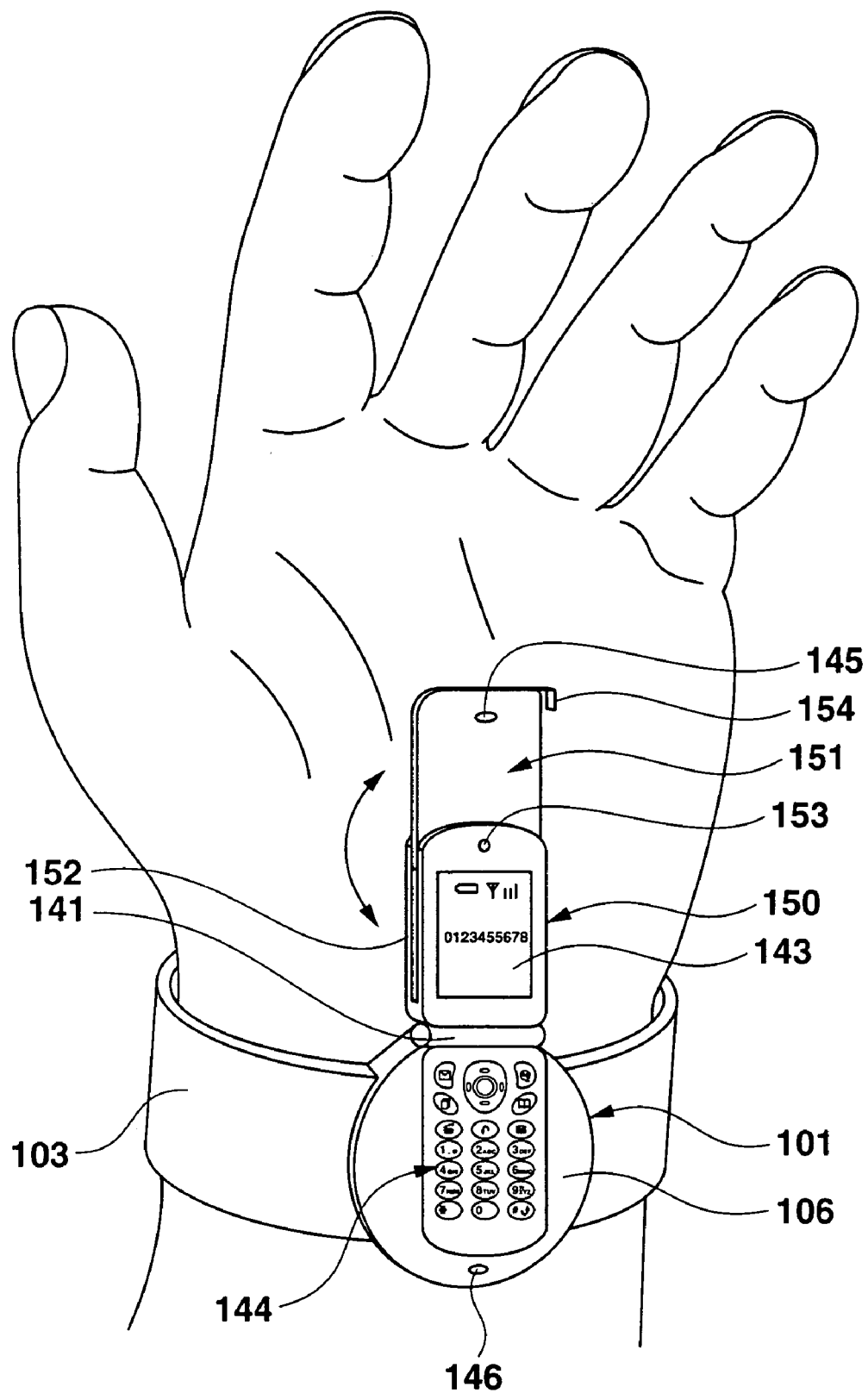
FIG. 18 is a perspective view of a seventh embodiment of the communications apparatus according to the present invention worn on the user's wrist with its lid open.
Figure 19:
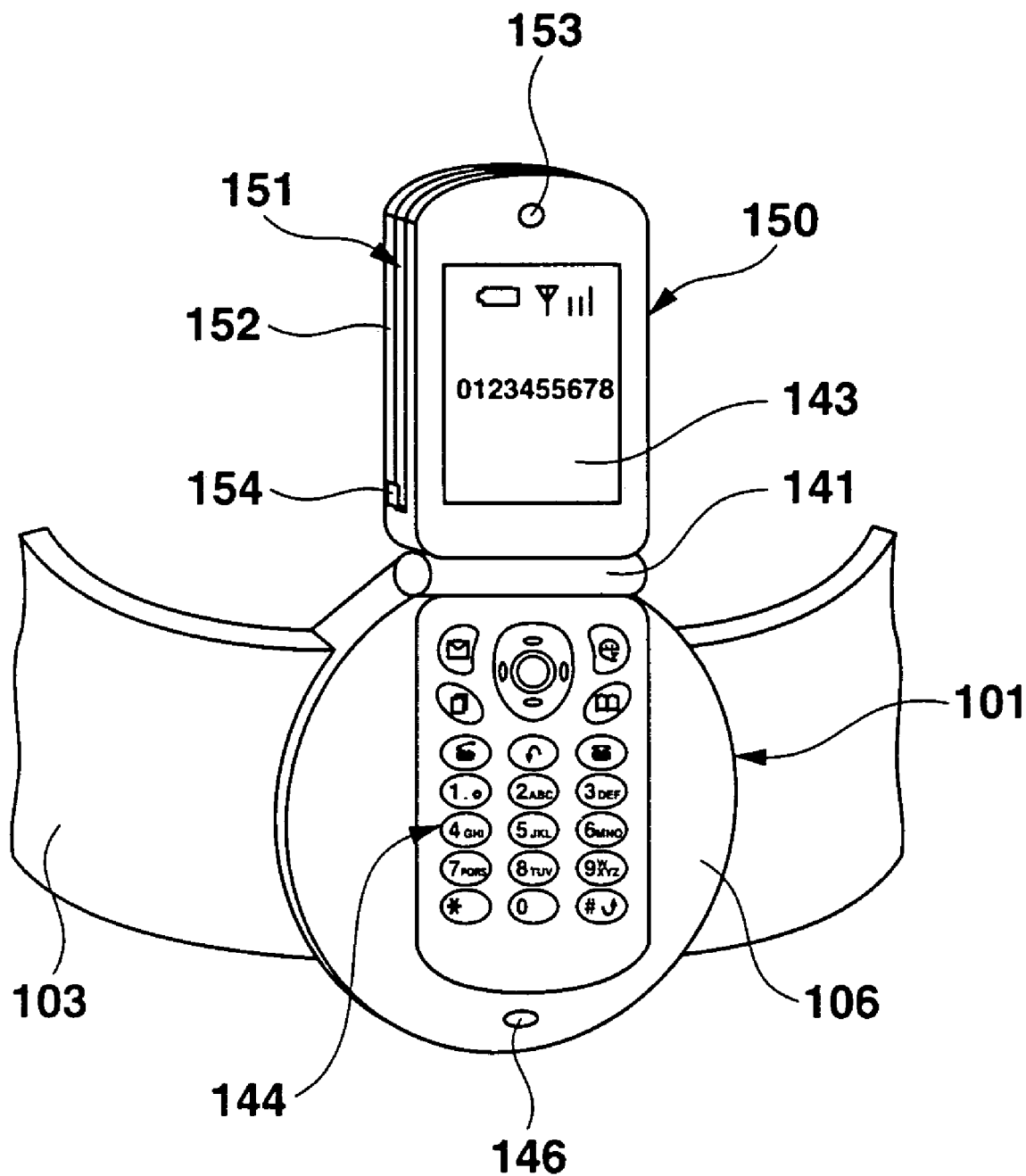
FIG. 19 is a perspective view of the communications apparatus of FIG. 18 with an open lid within which a speaker-mounting member is received.

Referring to FIGS. 18 and 19, a seventh embodiment of the wrist-worn communications apparatus will be described. The same reference numeral is used to denote the same element of the seventh embodiment of FIGS. 18 and 19 and the sixth embodiment of FIGS. 16 and 17.

This communications apparatus of the seventh embodiment has substantially the same structure as the sixth embodiment excluding that a speaker-mounting board 151 on which the speaker unit 145 is mounted is received within a cavity in the substantially rectangular lid 150 attached openable through the hinge 141 to the watch 101 such that the speaker-mounting board 151 can appear outside from the lid 150.

As in the sixth embodiment, the hinge 141 is provided on an upper edge of the case 106 parallel to an edge of the bands 103 (FIG. 18). As shown in FIG. 18, the rectangular lid 150 has a slit-like cavity 152 extending therein parallel to the face of the second display unit 143, and open on the left and upper sides thereof. The cavity 152 receives therein the speaker-mounting board 151, which takes a substantially rectangular plate turnable around a pivot 153, such that the board 151 can appear outside from the cavity. The lid 150 has the first display unit 142 for a timepiece (not shown) on the front thereof (as 142 in FIG. 16) and the second display unit 143 for communicating purpose on the inner surface thereof.

A hook 154 is provided on a lower left-side end of the speaker-mounting board 151 to pull this board out from the cavity 152 in the lid 150, as shown in FIG. 19. As shown in FIG. 18, the speaker unit 145 is provided on an end of the speaker-mounting board 151 remote from the pivot 153. The speaker unit 145 is connected electrically along with the first and second display units 142 and 143 to the circuit board (not shown) within the case 106 by leads (not shown) extending through the speaker-mounting board 151, the pivot 153 and the lid 150.

This communications apparatus produces beneficial effects similar to those produced by the fifth embodiment. Especially, the lid 150 has the cavity 152 in which the speaker-mounting board 151 with the speaker unit 145 thereon is supported turnable at the pivot 153. Thus, when the user communicates with the other party by opening the lid 150 from the case 106, the user pulls out the hook 154 with his or her fingers to thereby turn the speaker-mounting board 151 around the pivot 153 through 180 degrees and hence cause the speaker-mounting board 151 to appear outside from the lid 150 on the opposite side of the pivot 153 from the hinge 141.

Therefore, in this embodiment the speaker unit 145 can be placed at a position remoter by the length of the speaker mounting board 151 from the microphone unit 146 than in the sixth embodiment. This further ensures prevention of howling by the microphone unit 146 compared to the sixth embodiment. It also ensures that when the microphone unit 146 is brought close to the user's mouth, the speaker unit 145 can be brought closer to the user's ear selected to thereby improve both the directivities of the speaker unit 145 and the microphone unit 146.

Eighth Embodiment

Next, with reference to FIG. 20, an eighth embodiment of the wrist-worn communications apparatus will be described. The same reference numeral is used to denote the same element of the eighth embodiment of FIG. 20 and the sixth embodiment of FIGS. 16 and 17.

Figure 16:
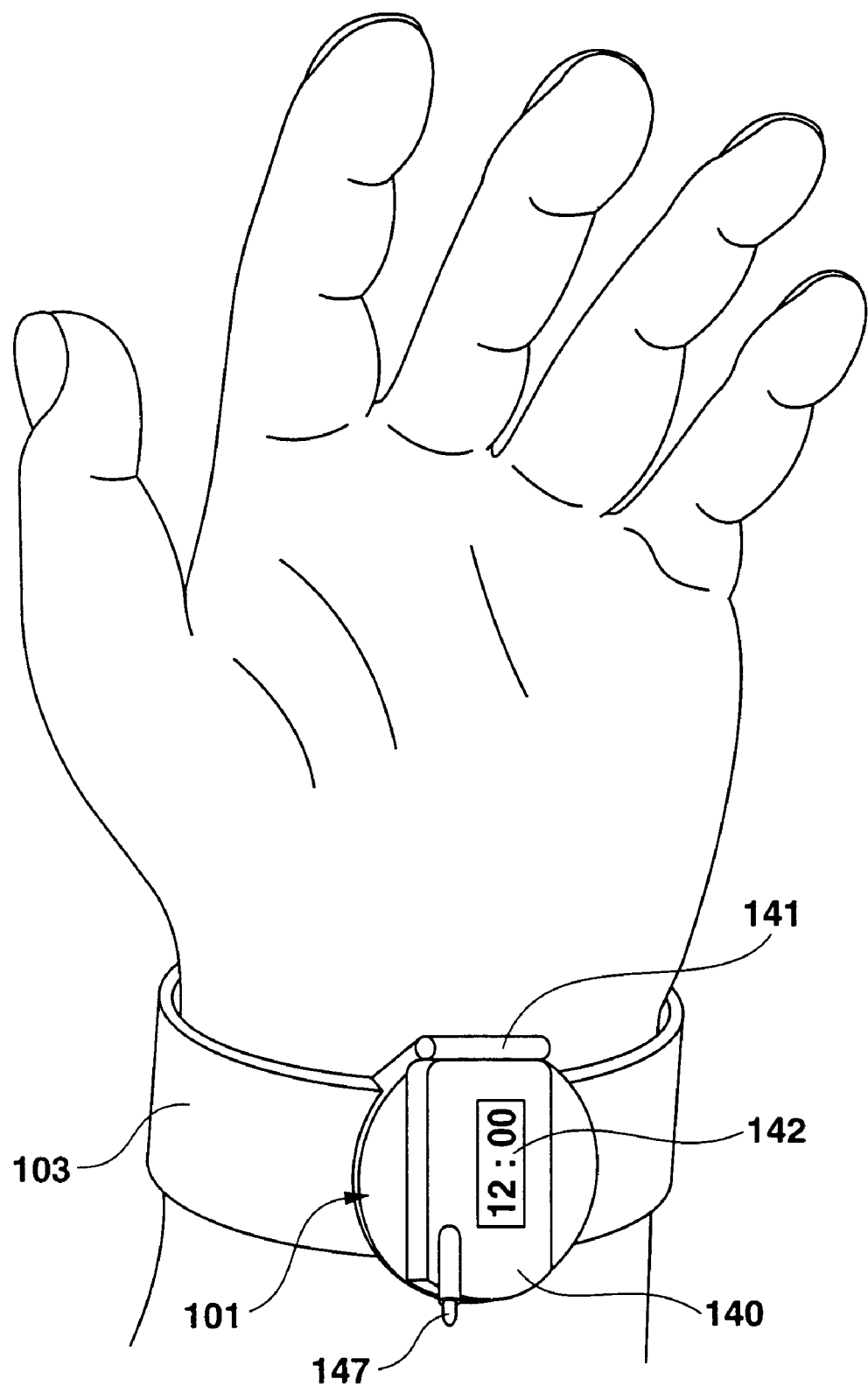
FIG. 16 is a perspective view of a sixth embodiment of the communications apparatus according to the present invention worn on a user's wrist.

The eighth embodiment of the apparatus has substantially the same structure as the sixth embodiment of FIGS. 16 and 17 except that a speaker-mounting board 155 on which the speaker unit 145 is mounted is connected at one (lower) edge through a second hinge 156 to an edge of the lid 140 with its other edge connected by the first-mentioned hinge 141 to the case 106 of the watch 101. Also, in this case the first-mentioned hinge 141 is disposed at an (upper) edge of the case 106 in the extending direction of the bands 103.

The speaker-mounting board 155 is sized enough to cover the inner surface of the lid 140 on which the second display unit 143 is provided. Thus, when the speaker-mounting board 155 is turned through the second hinge 156 to thereby be closed, it is superposed on the inner surface of the lid 140 whereas when the speaker-mounting board 155 is opened, it is placed so as to extend outward from the second hinge 156 on its opposite side from the second display unit 143.

Figure 20:
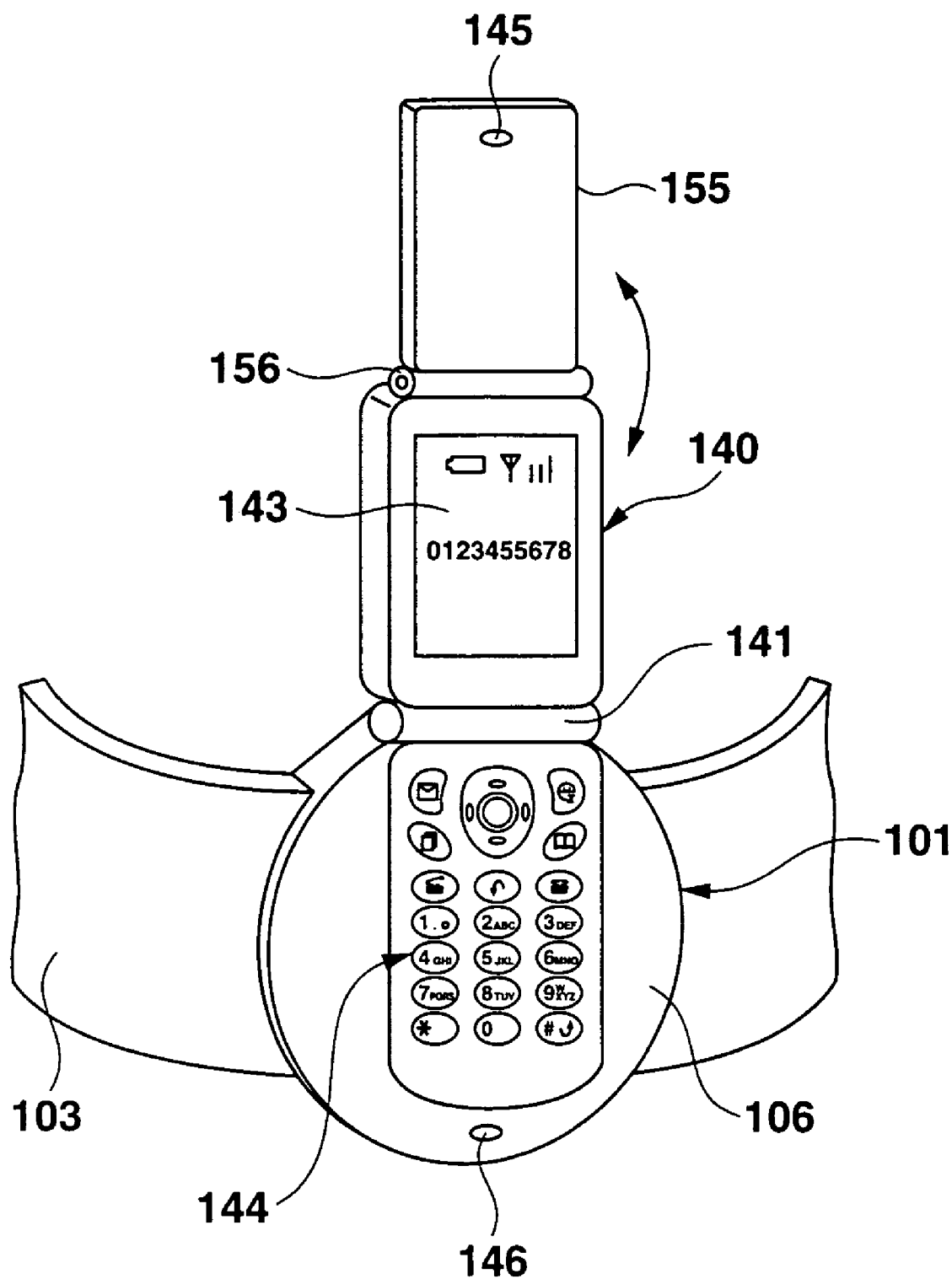
FIG. 20 is a perspective view of an eighth embodiment of the communications apparatus according to the present invention with its lid and speaker-mounting plate open in use.

As shown in FIG. 20, the speaker unit 145 is provided on an end of the speaker-mounting board 155 remote from the second hinge 156. The speaker unit 145 is connected electrically to the circuit board (not shown) housed in the case 106 by leads (not shown) extending through the speaker-mounting board 155, the second hinge 156 and the lid 140. The first and second display units 142 and 143 are also electrically connected by leads (not shown) to the circuit board.

This communications apparatus also produces beneficial effects similar to those produced by the sixth embodiment.

In addition, especially, the speaker-mounting board 155 is connected turnable by the second hinge 156 to the lid 140 and the speaker unit 145 is provided on the speaker-mounting board 155. Thus, when the user communicates with the other party, he or she opens the key-in unit 144 by opening the lid 140 from the case 140, and then further exposes the speaker unit 145 on the speaker-mounting board 155 by turning this board 155 through the second hinge 156 from the lid 140, the speaker-mounting board 155 is placed on the opposite side of the second hinge 156 from the second display unit 143. That is, as in the sixth embodiment, the speaker unit 145 is placed at a position remote sufficiently, or by the length of the speaker-mounting board 155, from the microphone unit 146 to thereby prevent the occurrence of howling by the microphone unit 146 surely. When the microphone unit 146 is brought close to the user's mouth, the speaker unit 145 can be brought sufficiently close to the user's ear selected as in the sixth embodiment. Thus, both the directivities of the speaker unit 145 and the microphone unit 146 are improved.

While in the eighth embodiment the speaker-mounting board 155 is illustrated as connected through the second hinge 156 to the lid 140, the present invention is not limited to this particular case. For example, the speaker-mounting board 155 may be received within a slit-like cavity in the lid 140 open only on the opposite side of the lid 140 from the hinge 141 such that the board 155 can appear outside from the cavity. Also in this case, as in the sixth embodiment the first display unit 142 and the second display unit 143 may be provided on the outer and inner surfaces, respectively, of the lid 140. In this case, beneficial effects similar to those produced by the seventh embodiment are produced.

While in the first to eighth embodiments and their modifications the wrist-worn communications apparatus in which the watch 101 is worn on the user's wrist W by the bands 103 have been illustrated, the present invention is not limited to these cases. For example, the present invention is widely applicable to wrist-worn communications apparatus in which a communication device that comprise a transceiver unit, a display unit and an input unit and that is worn on the user's wrist by the bands as well as to arm-worn communications apparatus in which the watch is worn on another part of the user's arm such as the user's upper arm.

While in the first to eighth embodiments and their modifications the method of using the wrist-worn communications apparatus has been illustrated which comprises laying the palm of his or her hand whose wrist (for example, left wrist as shown in FIG. 8) wears the watch 101 thereon on his or her ear present on the side of that palm of his or her hand (for example, left ear shown in FIG. 8), the present invention is not limited to this particular case. For example, the present invention may be carried out in such a manner that the user can lay the palm (for example, left) of his or her hand, whose wrist (for example, left wrist as shown in FIG. 8) wears the watch 101 thereon, on his or her (right) ear on the side of his or her other hand to communicate with the other party.

The wrist-worn communications apparatus of the embodiment of FIGS. 5-9 comprises a communication device (101); a band 103 for wearing the device on a user's wrist; a support member (105, 118) attached at a predetermined position (104) on the band where the support member can extend in the transverse direction of the band and in the extending direction of the band in which the support member is superposed on the band; a speaker unit 111 provided on one end of the support member so as to face outward in the extending direction of the support member; and a microphone unit 112 disposed on the other end of the support member so as to face in the direction substantially perpendicular to a surface of the support member.

According to the wrist-worn communications apparatus of this embodiment, the support member is attached on the band that wears the device on the user's wrist such that the support member can turn so as to extend in the transverse direction of the bands and in the extending direction of the band in which the support member is superposed on the band. Thus, even when the device is worn on the user's wrist by the band and the support member is turned to the transverse direction of the band for communicating purposes, the fronts of the microphone and speaker units can easily and surely be directed toward the user's mouth (M) and ear (E) present on that wrist, respectively, of the user to thereby ensure the directivities of both the speaker and microphone units.

In the wrist-worn communications apparatus of the embodiment of FIGS. 5-9 the support member (105, 118) takes the form of a strip and is supported by a pivot (110) at the predetermined position on the band.

Thus, according to this apparatus, the support member can be easily turned around the pivot such that the support member extends in the transverse direction of the bands and in the extending direction of the band in which the support member is superposed on the band. Thus, the apparatus becomes easy to use. Especially, the support member has the form of a strip that can be superposed on the band in the extending direction. Thus, by superposing the support member on the band so as to extend in the extending direction of the band, the apparatus becomes portable without becoming a hindrance.

The wrist-worn communications apparatus of the embodiment of FIGS. 5-9 comprises a device (101); a band 103 for wearing the device on a user's wrist (W); a support member (105, 118) attached pivotally by a pivot (110) in a predetermined area (104) on the band, the support member having the form of a strip superposable on the band in the extending direction of the band; a speaker unit (111) provided on one end of the support member; a microphone unit 112 provided on the other end of the support member; and a lock member (113) for locking at least one end of the support member unlockably to the band.

According to this apparatus, the support member is provided turnable on the band at the pivot. Therefore, the support member can be easily turned so as to extend in the transverse direction of the bands and in the extending direction of the band in which the support member is superposed on the band. Thus, the fronts of the microphone and speaker units can be directed toward the user's mouth and ear selected, respectively, to thereby ensure the directivity of both the speaker and microphone units. Especially, when the support member is superposed on the band so as to extend in the extending direction of the band, at least one end of the support member is locked to the band by the lock member. Thus, the apparatus becomes easier to carry without being a hindrance. If lock members are provided on the opposite ends of the support member, the support member can be fixed closely to the band even when the support member is formed long such that the speaker and microphone units can easily be brought close to the user's ear selected and mouth, respectively. Thus, the apparatus becomes more portable.

In the wrist-worn communications apparatus of the embodiment of FIGS. 5-9, the speaker unit 111 provided on the one end of the support member (105, 118) faces outward in the extending direction of the support member whereas the microphone unit 112 provided on the other end of the support member faces in the direction perpendicular to an outer surface of the support member.

According to this apparatus, when the support member is turned so as to extend in the transverse direction of the band in a state in which the device is worn on the user's wrist by the band and when the front of the microphone unit is brought close to the user's mouth, the front of the speaker unit can surely be brought close to the user's ear selected. Thus, the directivities of both the speaker and microphone units are ensured.

The wrist-worn communications apparatus of the embodiment of FIGS. 10-13 comprises a device (101) having at least a timepiece function; a band 103 for wearing the device on a user's wrist (W); a communications unit (120, 130) having a key-in unit (123) provided at a predetermined position (104) on the band on the opposite side of the user's wrist, on which the device is worn, from the device; a lid (121, 131) attached openable by a hinge (122, 132) to the communications unit, the lid comprising a display unit (125) provided thereon; a microphone unit (124) provided on the communications unit on the opposite side of the key-in unit (123) from the hinge; and a speaker unit (126) provided on the lid on the opposite side of the display unit from the hinge.

According to this apparatus, the device has the timepiece function. Thus, like the general wristwatch, it can be worn on the user's wrist for use as a wristwatch. In addition, when especially it is used on the user's wrist for communicating purposes, the lid is opened through the hinge to thereby expose the key-in unit of the communications unit and the display unit on the internal surface of the lid. Thus, the user can manipulate the key-in unit while viewing the display unit. The microphone unit is provided on the communications unit on the opposite side of the key-in unit from the hinge and the speaker unit is provided on the inner surface of the lid on the opposite side of the display unit from the hinge. Thus, the microphone unit is spaced sufficiently from the speaker unit when the lid is opened to thereby prevent the occurrence of howling by the microphone unit. When the device is worn on the user's wrist so as to face in the same direction as the back of the hand concerned does, the communications unit is disposed on the side of the user's hand. Thus, by laying the palm of the user's hand, whose wrist wears the device, on his or her ear present on the side of the palm of the user's hand in a natural posture without bending in an unnatural manner his or her arm concerned with his or her wrist mentioned, the fronts of the microphone and speaker units are directed toward the user's mouth and ear present on the side of the palm of the user's hand, respectively, to thereby ensure the directivities of both the speaker and microphone units.

Figure 10:
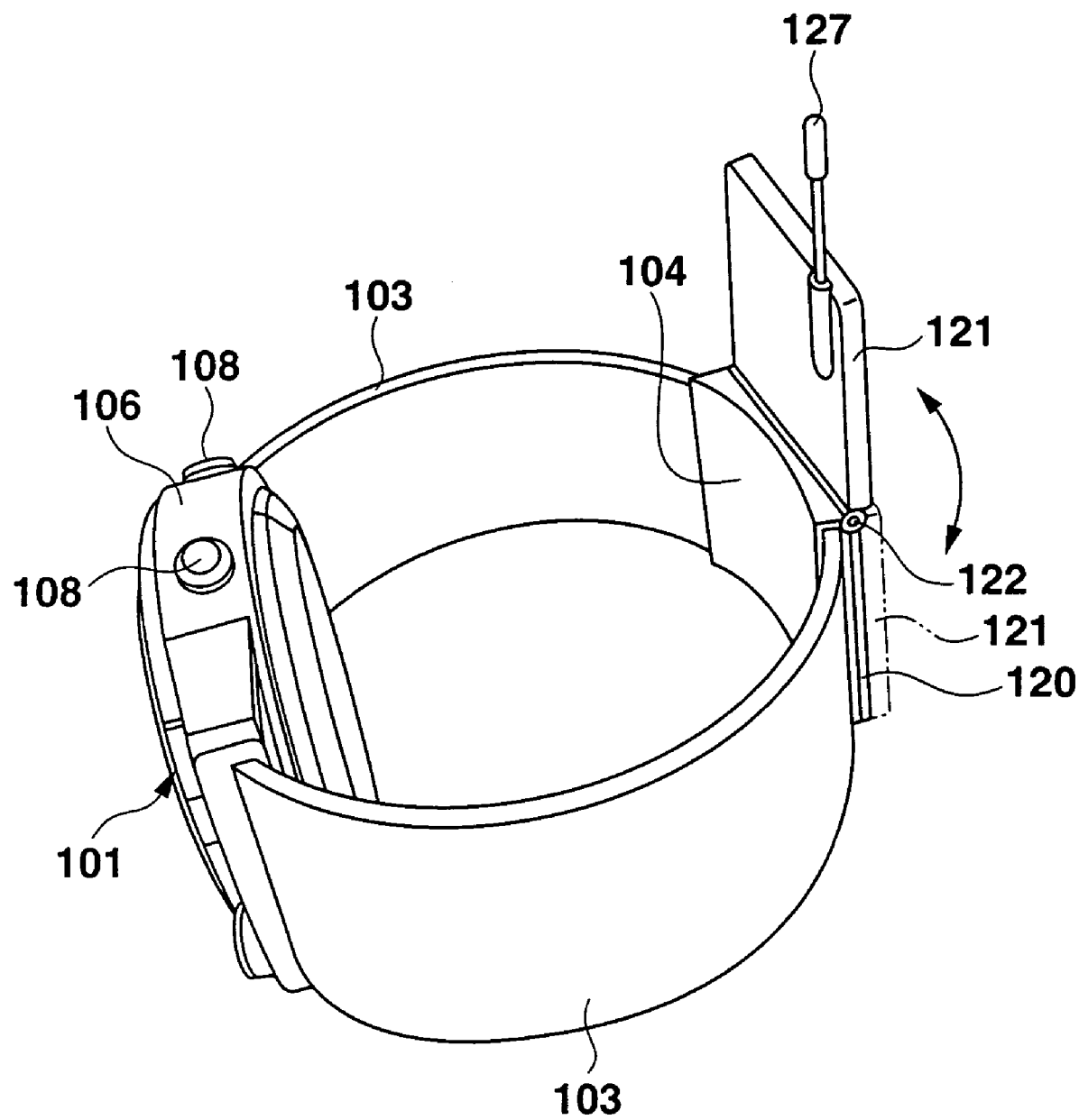
FIG. 10 is a perspective view of a third embodiment of the communications apparatus according to the present invention with the lid for its communications unit open.

In the wrist-worn communications apparatus of the embodiment of FIGS. 10 and 11, the lid (121) is liftable in the transverse direction of the band 103 through the hinge (122).

According to this apparatus, when the device is worn on the user's wrist so as to face in the same direction as the back of the user's hand concerned, the communications unit is disposed on the side of the palm of the user's hand mentioned and the lid is opened in the transverse direction of the bands. Thus, when the user lays that palm of his or her hand on his or her ear present on the side of that palm of the user's hand, the fronts of the microphone and speaker units can be directed toward the user's mouth and ear present on the side of that palm of the user's hand, respectively. Therefore, the user can communicate with the other party in a natural posture without the necessity of bending in an unnatural manner his or her arm concerned with his or her wrist mentioned. Thus, the apparatus becomes easier to use.

In the wrist-worn communications apparatus of the embodiment of FIGS. 10-13, the key-in unit (123) and the display unit (125) are disposed such that characters marked on the respective keys of the key-in unit and representing the information displayed on the display unit are arranged in a normal posture in the transverse direction of the band.

According to this apparatus, when the device is worn on the user's wrist such that the device faces in the same direction as the back of the user's hand does and the communications unit faces in the same direction as the palm of the user's hand does and when the lid is opened, the characters marked on the key-in unit and representing the information displayed on the display unit are arranged in a normal posture in the transverse direction of the band. Thus, by substantially horizontally holding the user's arm, whose wrist wears the device in a bent state before the user and directing that palm of the user's hand upward, the user can easily manipulate the key-in unit while viewing the display unit. Thus, the apparatus is easy to manipulate.

The wrist-worn communications apparatus of the embodiment of FIGS. 14-20 comprises a device (101) comprising at least a communication function and a key-in unit (144); a band 103 for wearing the device on a user's wrist; a lid (140, 150) attached openable by a hinge (141) to the device in the transverse direction of the band, the lid comprising a display unit (143) provided on an inner surface thereof that faces the device when the lid is closed; a speaker unit (145) provided on the lid on the opposite side of the display unit from the hinge; and a microphone unit (146) provided on one of the device and the lid at a position remote from the speaker unit.

According to this apparatus, when the lid is opened for communicating purposes through the hinge from the device worn on the user's wrist by the band, the key-in unit of the device and the display unit of the lid are exposed to thereby allow the user to manipulate the key-in unit while viewing the display unit. When the device is worn on the user's wrist so as to face in the same direction as the palm of the user's hand concerned with his or her wrist mentioned does and the lid is opened in the transverse direction of the band, the user can direct the fronts of the microphone and speaker units toward his or her mouth and ear present on that palm of the user's hand, respectively, by laying that palm of his or her hand on his or her ear present on that palm of the user's hand in a natural posture without the necessity of bending in an unnatural manner his or her arm concerned with his or her wrist mentioned. At this time, the speaker unit is disposed on the lid on the opposite side of the second display unit from the hinge and the microphone unit is disposed on the device on the opposite side of the key-in unit from the hinge. Thus, the microphone unit is sufficiently remote from the speaker unit to thereby prevent the occurrence of howling by the microphone unit and ensure the directivities of both the speaker and microphone units.

In the wrist-worn communications apparatus of the embodiment of FIGS. 16 and 17, the microphone unit (146) is provided on the device (watch 101) on the opposite side of the key-in unit (144) from the hinge (141).

Therefore, according to this apparatus, the microphone unit is placed at a position remote from the speaker unit to thereby ensure that the occurrence of howling by the microphone unit is prevented and good telephone call is achieved.

The wrist-worn communications apparatus of the embodiment of FIGS. 18-20 comprises a speaker-mounting member (151, 155) on which the speaker unit (145) is mounted, the mounting member being housed within the lid (140, 150) so as to be extensible outward in the opposite direction from the hinge (141).

Therefore, according to this apparatus, the speaker unit is disposed at a position remoter from the microphone unit to thereby ensure that the occurrence of howling by the microphone unit is prevented and that especially, the speaker unit and the microphone unit can be easily brought close to the user's ear and mouth, respectively, to thereby improve the directivities of both the speaker and microphone units.

In the wrist-worn communications apparatus of the embodiment of FIGS. 14-20, the key-in unit (123) and the display unit (125) are disposed such that characters marked on the respective keys of the key-in unit and representing the information displayed on the display unit are arranged in a normal posture in the transverse direction.

According to this apparatus, when the lid is opened from the device in the transverse direction of the band in a state in which the device is worn on the user's wrist so as to face in the same direction as the palm of the user's hand concerned with his or her wrist mentioned does, characters marked on the key-in unit and representing the information displayed on the display unit are arranged in a normal posture in the transverse direction of the band. Thus, when the user substantially horizontally supports his or her arm, whose wrist wears the device thereon, in a bent state before him or her such that the palm of his or her hand mentioned faces upward, the user can easily manipulate the key-in unit well while viewing the display unit. Thus, the apparatus is easy to use.

In the wrist-worn communications apparatus of FIGS. 5-9, the key-in unit (109A, 109B) is provided on either of the band and the support member.

Therefore, according to this apparatus, when the user communicates with the other party by telephone call or e-mail, he or she can easily manipulate the key-in unit well while viewing the display unit after the support member is removed from the bands or superposed on the bands so as to extend in the same direction as the band does. Thus, the apparatus is easy to use.

Various modifications and changes may be made thereunto without departing from the broad spirit and scope of this invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application Nos. 2003-21320 and 2003-32486 filed on Jan. 30, 2003 and Feb. 10, 2003, respectively, and each including specification, claims, drawings and summary. The disclosure of the above Japanese patent application is incorporated herein by reference in its entirety.

The invention claimed is:

1. A wrist-worn communications apparatus comprising:
a device;
a band that is coupled to the device and that is adapted to be worn on a user's wrist;
a speaker unit including a sound output cylinder that is disposed at a predetermined position on the band so that an output face of the sound output cylinder faces a same direction as an open face of the band through which the user's wrist is insertable; and a microphone unit including a sound input cylinder that is disposed in a vicinity of the speaker unit on a surface of the band so that an input face of the sound input cylinder is perpendicular to the output face of the sound output cylinder;

wherein when the user's wrist is inserted in the band and the band is worn on the user's wrist, the output face of the sound output cylinder is adapted to be directed to the user's ear and the input face of the sound input cylinder is adapted to be directed to the user's mouth.

2. The wrist-worn communications apparatus according to claim 1, further comprising:

a speaker-microphone assembly provided removably at the predetermined position on the band, wherein the speaker-microphone assembly comprises the speaker unit, the microphone unit and a mount on which the speaker unit and the microphone unit are mounted close to each other.

3. The wrist-worn communications apparatus according to claim 2, wherein the device and the speaker-microphone assembly are provided on opposite sides of the band so that when the user's wrist is inserted in the band and the band is worn on the user's wrist, the speaker-microphone assembly and the device are on opposite sides of the user's wrist.

4. The wrist-worn communications apparatus according to claim 3, wherein the device comprises at least one of an input unit, a display unit for communication purposes, and a timepiece unit.

5. A wrist-worn communications apparatus comprising:

a device;

a band that is coupled to the device and that is adapted to be worn on a user's wrist;

a support belt member disposed at a predetermined position on the band such that the support belt member can extend (i) along a longitudinal direction of the band, and (ii) in a direction perpendicular to the longitudinal direction of the band;

a speaker unit including a sound output cylinder provided on one end of the support belt member so that when the band is worn on the user's wrist and the support belt member is extended in the direction perpendicular to the longitudinal direction of the band, an output face of the sound output cylinder faces a same direction as an open face of the band through which the user's wrist is insertable;

a microphone unit including a sound input cylinder that is disposed on an opposite end of the support belt member so that an input face of the sound input cylinder is perpendicular to the output face of the sound output cylinder; and wherein when the band is worn on the user's wrist and the support belt member is extended in the direction perpendicular to the longitudinal direction of the band, the output face of the sound output cylinder is adapted to be directed to the user's ear and the input face of the sound input cylinder is adapted to be directed to the user's mouth.

6. The wrist-worn communications apparatus according to claim 5, wherein the support belt member is supported by a pivot at the predetermined position on the band.

7. A wrist-worn communications apparatus comprising:

a device;

a band that is coupled to the device and that is adapted to be worn on a user's wrist;

a support belt member attached pivotally by a pivot to the band at a predetermined position on the band;

a speaker unit including a sound output cylinder provided on one end of the support belt member so that when the band is worn on the user's wrist and the support belt member is pivoted in a direction perpendicular to a longitudinal direction of the band, an output face of the sound output cylinder faces a same direction as an open face of the band through which the user's wrist is insertable;

a microphone unit including a sound input cylinder provided on an opposite end of the support belt member so that an input face of the sound input cylinder is perpendicular to the output face of the sound output cylinder; and at least one lock member which locks at least one end of the support belt member unlockably to the band;

wherein when the band is worn on the user's wrist and the support belt member is pivoted perpendicular to the longitudinal direction of the band, the output face of the sound output cylinder is adapted to be directed to the user's ear and the input face of the sound input cylinder is adapted to be directed to the user's mouth.

8. The wrist-worn communications apparatus according to claim 7, wherein the output face of the sound output cylinder faces outward in an extending a direction of the support belt member.

* * * * *